United States Patent
Milici

(10) Patent No.: US 11,578,982 B2
(45) Date of Patent: Feb. 14, 2023

(54) METHOD AND APPARATUS FOR MAP MATCHING TRACE POINTS TO A DIGITAL MAP

(71) Applicant: HERE GLOBAL B.V., Eindhoven (NL)

(72) Inventor: Mike Manual Milici, Chicago, IL (US)

(73) Assignee: HERE Global B.V., Eindhoven (NL)

(*) Notice: Subject to any disclaimer, the term of this patent is extended or adjusted under 35 U.S.C. 154(b) by 372 days.

(21) Appl. No.: 16/059,888

(22) Filed: Aug. 9, 2018

(65) Prior Publication Data
US 2020/0049512 A1  Feb. 13, 2020

(51) Int. Cl.
| | |
|---|---|
| G01C 21/00 | (2006.01) |
| G06V 20/56 | (2022.01) |
| G06F 16/29 | (2019.01) |
| G01C 21/32 | (2006.01) |

(52) U.S. Cl.
CPC .......... *G01C 21/32* (2013.01); *G01C 21/3811* (2020.08); *G01C 21/3841* (2020.08); *G01C 21/3867* (2020.08); *G06F 16/29* (2019.01); *G06V 20/588* (2022.01)

(58) Field of Classification Search
CPC ...... G01C 21/32; G06F 16/29; G06K 9/00798
USPC .......................................................... 701/446
See application file for complete search history.

(56) References Cited

U.S. PATENT DOCUMENTS

| | | | | |
|---|---|---|---|---|
| 8,209,121 | B1* | 6/2012 | Ogale | G01C 21/30 |
| | | | | 701/532 |
| 8,718,932 | B1* | 5/2014 | Pack | G01C 21/30 |
| | | | | 701/446 |
| 10,288,434 | B2* | 5/2019 | Dorum | G01C 21/30 |
| 2007/0078594 | A1 | 4/2007 | Mori | |
| 2014/0132608 | A1 | 5/2014 | Mund et al. | |
| 2014/0244164 | A1* | 8/2014 | Gale | G01C 21/30 |
| | | | | 701/446 |

(Continued)

FOREIGN PATENT DOCUMENTS

CN   104197945 A   12/2014

OTHER PUBLICATIONS

Schuessler et al., "Map-matching of GPS Traces on High-resolution Navigation Networks Using the Multiple Hypothesis Technique (MHT)," Oct. 2009, 24 pages.

(Continued)

*Primary Examiner* — Yazan A Soofi
*Assistant Examiner* — Naeem Taslim Alam
(74) *Attorney, Agent, or Firm* — Ditthavong, Steiner & Mlotkowski

(57) ABSTRACT

An approach is provided for pattern-based map matching of a probe trace to a digital map. The approach involves querying the digital map for a set of road links within a threshold distance of a probe point. The approach also involves determining a match starting point for each road link of a set of road links. The approach further involves selecting a sampled probe point from the probe trace. The approach also involves generating one or more patterns for said each road link based on the match starting point, the sampled probe point, the topology polyline, or a combination thereof. The approach further involves selecting a matched road link from among the set of road links based on the one or more patterns. The probe point is then snapped to the matched road link.

18 Claims, 14 Drawing Sheets

(56) References Cited

U.S. PATENT DOCUMENTS

| | | | | |
|---|---|---|---|---|
| 2015/0325015 | A1* | 11/2015 | Brand | G06T 11/20 |
| | | | | 345/443 |
| 2016/0358349 | A1* | 12/2016 | Dorum | G06T 11/203 |
| 2016/0377440 | A1* | 12/2016 | Dorum | G01C 21/3492 |
| | | | | 702/150 |

OTHER PUBLICATIONS

Hashemi et al., abstract of "A Weight-based Map-matching Algorithm for Vehicle Navigation in Complex Urban Networks," Nov. 2016, Journal of Intelligent Transportation Systems, vol. 20, Issue No. 6, 2 pages.

* cited by examiner

METHOD AND APPARATUS FOR MAP MATCHING TRACE POINTS TO A DIGITAL MAP

BACKGROUND

Traditionally, map-matchers (e.g., point-based map matchers) are used to process probe or trace (e.g., Global Positioning Satellite (GPS) points) representing vehicle travel along a road network to match these points to the correct road or links on the network that a probe device or vehicle is traveling (e.g., for route guidance purposes). However, current map-matchers can encounter issues when links are very close together and have similar geographies (i.e., the links are not easily distinguishable). As a result, service providers face significant technical challenges to improve map matching accuracy for links that are close together and look similar.

SOME EXAMPLE EMBODIMENTS

Therefore, there is a need for map matching of probe points to a digital map that reduces ambiguity compared to traditional point-based map matchers.

According to one embodiment, a computer-implemented method for map matching a probe trace to a digital map comprises querying the digital map for a set of road links within a threshold distance of a probe point of the probe trace. The method also comprises determining a match starting point for each road link of a set of road links, wherein the match starting point is an intersection point created by a normal line extending from the probe point to a topology polyline representing said each road link. The method further comprises selecting a sampled probe point from the probe trace. The method also comprises generating one or more patterns for said each road link based on the match starting point, the sampled probe point, the topology polyline, or a combination thereof, wherein the one or more patterns include a probe heading pattern, a probe distance pattern, a probe area pattern, or a combination thereof. The method further comprises selecting a matched road link from among the set of road links based on the one or more patterns. The probe point is then snapped to the matched road link.

According to another embodiment, an apparatus for map matching a probe trace to a digital map comprises at least one processor, and at least one memory including computer program code for one or more computer programs, the at least one memory and the computer program code configured to, with the at least one processor, cause, at least in part, the apparatus to query the digital map for a set of road links within a threshold distance of a probe point of the probe trace. The apparatus is also caused to determine a match starting point for each road link of a set of road links, wherein the match starting point is an intersection point created by a normal line extending from the probe point to a topology polyline representing said each road link. The apparatus is further caused to select a sampled probe point from the probe trace. The apparatus is also caused to generate one or more patterns for said each road link based on at least one of a probe heading pattern, a probe distance pattern, and a probe area pattern. The apparatus is further caused to select a matched road link from among the set of road links based on the at least one pattern, wherein the probe point is snapped to the matched road link.

According to another embodiment, a computer-readable storage medium for map matching a probe trace to a digital map carries one or more sequences of one or more instructions which, when executed by one or more processors, cause, at least in part, an apparatus to query the digital map for a set of road links within a threshold distance of a probe point of the probe trace. The apparatus is also caused to determine a match starting point for each road link of a set of road links, wherein the match starting point is an intersection point created by a normal line extending from the probe point to a topology polyline representing said each road link. The apparatus is further caused to select a sampled probe point from the probe trace. The apparatus if also caused to generate one or more patterns for said each road link based on the match starting point, the sampled probe point, the topology polyline, or a combination thereof, wherein the one or more patterns include a probe heading pattern, a probe distance pattern, a probe area pattern, or a combination thereof. The apparatus is further caused to select a matched road link from among the set of road links based on the one or more patterns, wherein the probe point is snapped to the matched road link.

According to another embodiment, an apparatus for map matching a probe trace to a digital map comprises means for querying the digital map for a set of road links within a threshold distance of a probe point of the probe trace. The apparatus also comprises means for determining a match starting point for each road link of a set of road links, wherein the match starting point is an intersection point created by a normal line extending from the probe point to a topology polyline representing said each road link. The apparatus further comprises a means for selecting a sampled probe point from the probe trace. The apparatus also comprises means for generating one or more patterns for said each road link based on the match starting point, the sampled probe point, the topology polyline, or a combination thereof, wherein the one or more patterns include a probe heading pattern, a probe distance pattern, a probe area pattern, or a combination thereof. The apparatus further comprises means for selecting a matched road link from among the set of road links based on the one or more patterns, wherein the probe point is snapped to the matched road link.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for performing pattern-based map matching of trace points to a digital map, according to one embodiment, are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
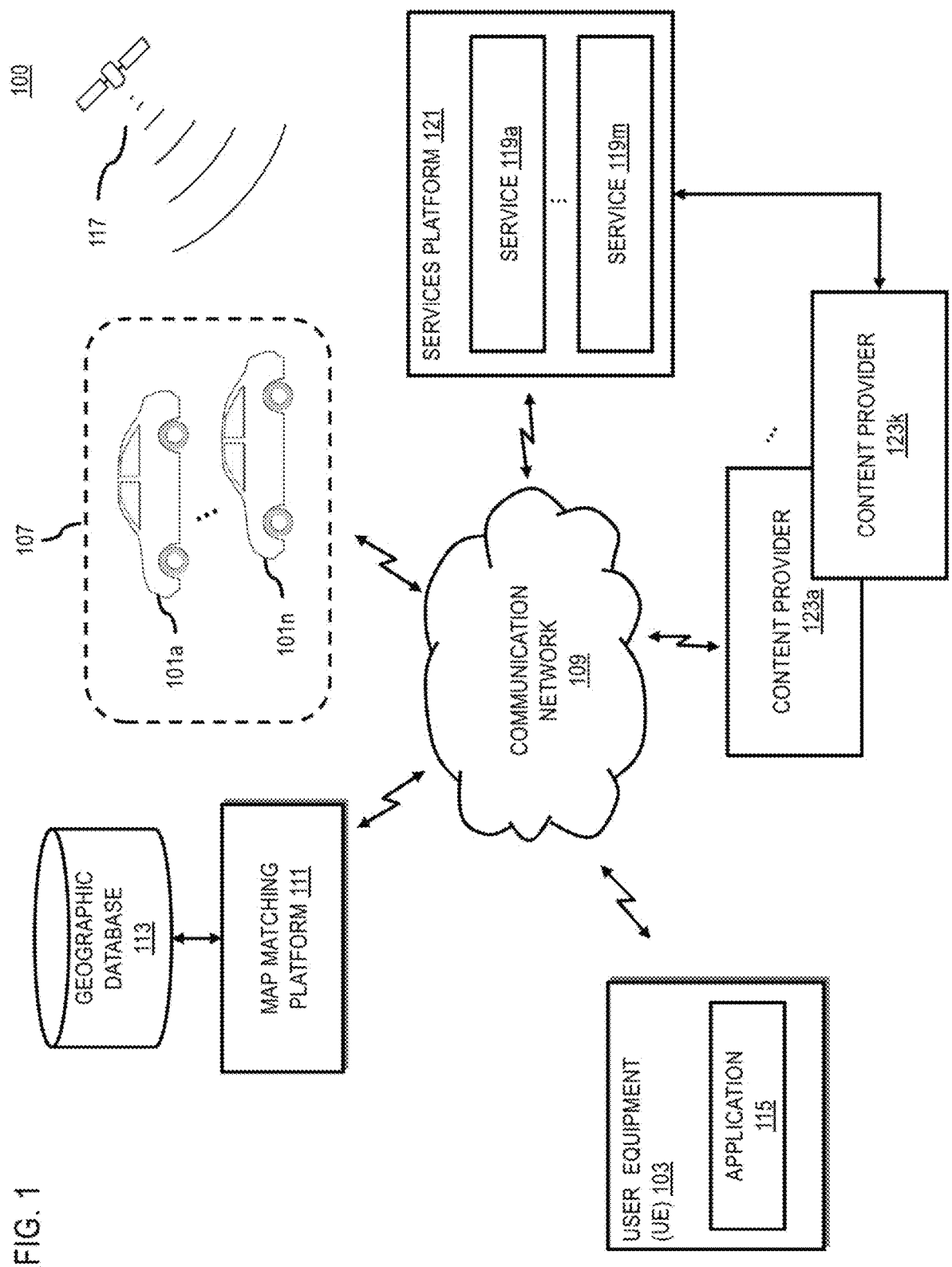
FIG. 1 is a diagram of a system capable of pattern-based map matching of probe points to a digital map, according to one embodiment.

FIG. 1 is a diagram of a system capable of map matching a probe or trace point to a digital map based on sampling and pattern recognition, according to one embodiment. Analysis of probe data consisting of location sensor data (e.g., GPS data and other satellite-based location data) often forms the basis for many mapping and navigation related services. For example, probe data analytics generally is based on having probe points (e.g., collected location points of probes traveling within a road network or other geographic area) matched to digital map data to figure out where those probes are on the road network (e.g., there may be an inherent error rate associated with GPS data). This analysis can then be used, for instance, to determine traffic patterns, etc. for using in providing mapping and navigation services. To perform this map matching, map matchers can process raw location data (e.g., probe data comprising GPS trace points or other location data) to identify which road, path, link, etc. a probe device (e.g., a vehicle, navigation device, mobile device, smartphone, etc.) is travelling, and to determine the location of the probe device on that identified road segment, link, etc.

Although map matchers have been used widely, the map matching problem is still a challenge for the map making industry because current map matching techniques result in poor matching when links or roads are very close together and have similar geographies. In addition, current solutions do not account for the width of the road. For example, the probe points or probe headings of a first vehicle (e.g., vehicle 101a) traveling along a wide road (e.g., a highway consisting of several lanes) and the probe points or probe headings of a second vehicle (e.g., vehicle 101n) traveling along an access road proximate and parallel to the highway (e.g., a frontage road near the wide road) may appear identical despite the first and second vehicles traveling on separate links. In this example, current map matching techniques may match or snap a probe point or entire probe trace to the wrong link. This type of error may be amplified where one road or link is wide (e.g., a multilane highway) and the other road or link is narrow (e.g., a frontage road near the wide road) because in this situation, a vehicle (e.g., vehicle 101a) may be traveling closer to the narrow road or link than the centerline of the wide road and, therefore, the centerline calculations of current map matching may wrongly assume that the vehicle 101a is traveling along the narrow road or link and will often place the vehicle 101a on the narrow road or frontage road because they do not correctly account for the width of the wide road or highway in the calculations.

To address this problem, the system 100 of FIG. 1 introduces a pattern-based map matcher to improve map matching accuracy particularly with respect to links that are very close together and that have similar geographies. In addition, the system 100 can utilize the width of a road with respect to the distance and area patterns, as described below. In one embodiment, the system 100 performs sampling and pattern recognition map matching using the following: (1) a detailed correct digital map with normal GPS accuracy (e.g., degrees given to 5 decimal places); (2) a spatial search that can identify all the road segments within a given distance of each GPS pattern point or probe point (e.g., 20 or 30 meters); and an ability to associate link direction of travel with GPS direction of travel (e.g., an ability to know whether a probe trace is being snapped to a link running in the opposite direction).

In one embodiment, the system 100 determines a pattern of GPS points that are then inputted or analyzed for snapping. These GPS points may be referred to as input GPS (IGPS) points. In one embodiment, the system 100 first determines whether the pattern of GPS points is valid. For example, the system 100 may determine whether a distance between points is accurate/possible, whether probe traces are crossing each other, etc. In one embodiment, as described more fully below, once the system 100 validates the pattern, with respect to each point in the IGPS, the system 100 performs the following: (a) searches a digital map for all roads or links within a set limit of the pattern of GPS points (e.g., 20 or 30 meters); (b) determines a match starting point for each road or link; (c) applies a candidate ambiguity pattern matching selection to the available points; and (d) if an empty list is returned, selects the next IGPS point for analysis.

In one embodiment, the system 100 initially finds the group of candidate links or roads by performing a spatial search. In one instance, the results of the search fall into one of two categories. For example, the first category includes links where a transition point (e.g., entering and exiting an intersection) is known to the system 100. In one embodiment, the system 100 can use the ends of the links to skip the snap evaluation process described below with respect to FIGS. 3 and 4 since the end of the link (e.g., road) is the entry point. The second category, in one instance, includes links where no historical vehicle paths are known by the system 100.

In one embodiment, the system 100 creates a reference for each link in the search. The use of sampling, in this instance, amplifies the effects of each pattern of GPS points, which will allow one pattern of GPS points to stand clearly above the others. In one instance, the system 100's spatial search for drivable links returns the set of possible road link candidates. One or more probe points are then snapped to each candidate link using the snap process described below with respect to FIGS. 2-4. This process returns the closest probe or trace point along the segment of road on which the vehicle (e.g., vehicle 101a) appears to be at. The system 100 then uses vehicle heading and link headings to determine direction of travel along the candidate link. This process selects the initial sample point or starting point for the link and also accounts for the direction to analyze the link shape points or probe points.

Figure 2:
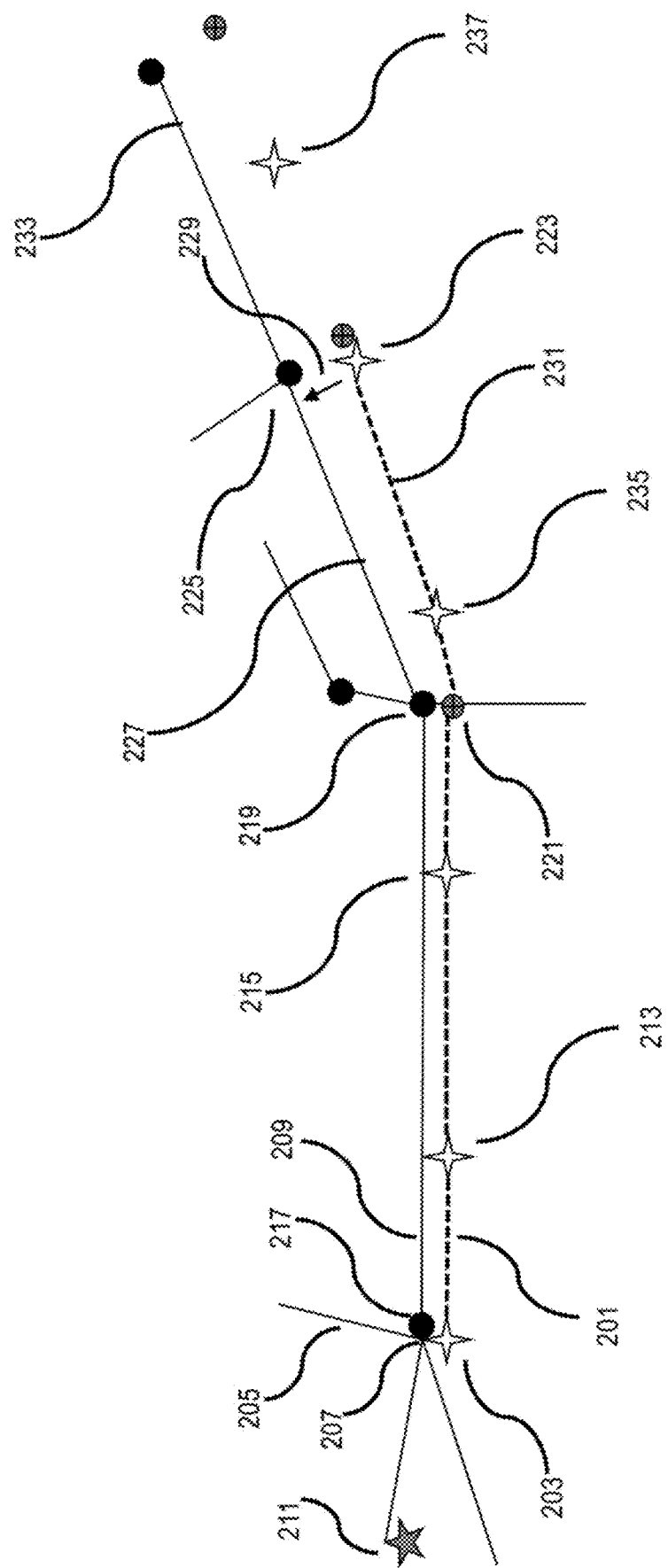
FIG. 2 is a diagram illustrating a process for snapping a probe point to a candidate link or road segment, according to one embodiment.

FIG. 2 is a diagram illustrating a process for snapping a probe point to a candidate link or road segment, according to one embodiment. In one instance, the system 100 starts at the beginning of a high definition (HD) centerline 201 (e.g., probe point 203) and searches for an unambiguous link snap to determine a match starting point. In one embodiment, the system 100 determines a normal to the vehicle path or HD centerline 201 (e.g., line 205) and then uses the intersection 207 of the normal 205 and the spatial road (e.g., the link 209) as the starting point 211 along that road 209 that the trace 203 may be referencing. In one embodiment, the system 100 can determine that this is a snap point (i.e., point 203 is snapped to link 209) and then test the validity of the snap.

Figure 3:
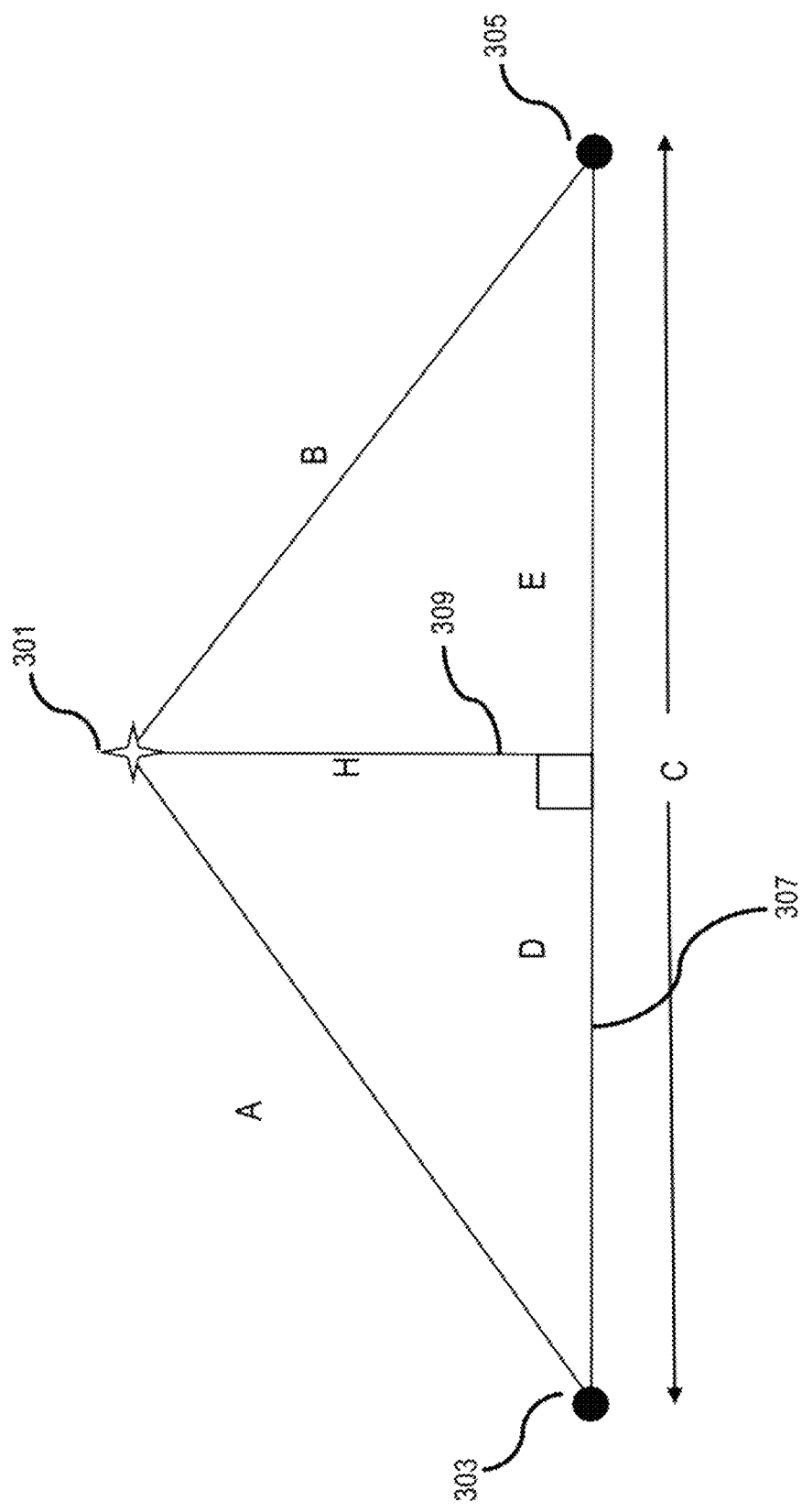
FIGS. 3 and 4 are diagrams illustrating processes for determining the validity of a snap point, according to one embodiment.
Figure 4:
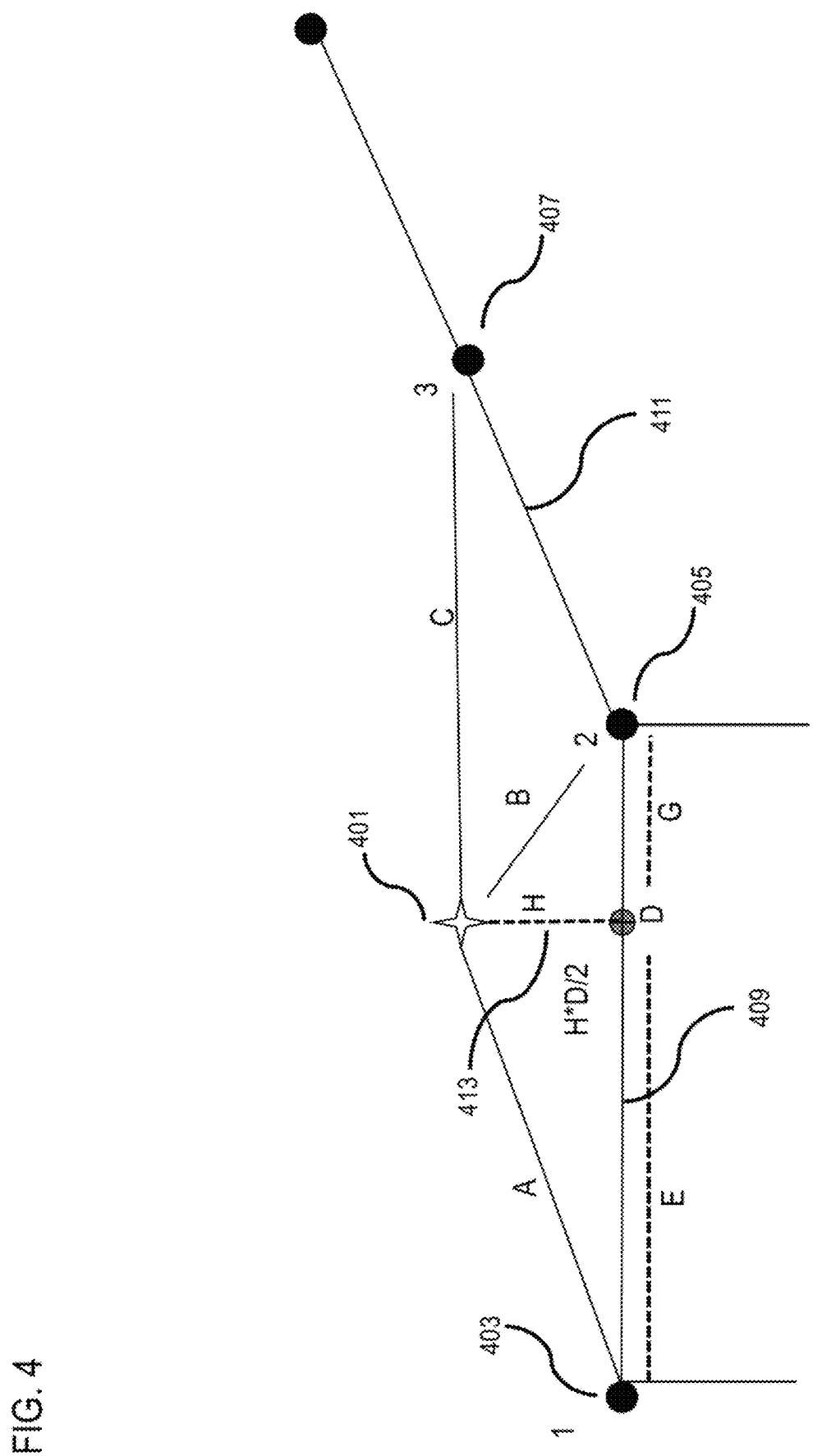

FIGS. 3 and 4 are diagrams illustrating processes for determining the validity of a snap point, according to one embodiment. In one embodiment, the system 100 utilizes basic trigonometry to determine a validity of a snap 301. As shown, the system 100 determines a HD map centerline shape point 301 (e.g., by GPS) between two core map link shape points 303 and 305 (e.g., nodes) between a link 307. In one embodiment, the two core map link points 303 and 305 are used to determine the exact latitude, longitude of the closest point in the core map geography to the HD map centerline. In this instance, link 307 represents the base and C represents the distance between the shape points 303 and 205 that the system 100 is snapping the point 301 into. In one embodiment, the distance C from shape point 303 to the end of the link 307 (shape point 305) determines the distance along the HD map centerline that the core map attributes apply to. In one instance, if the system 100 can attach a perpendicular line H (e.g., line 309) between the link 307 and the shape point (point 301) and if the system 100 determines that the distance of the line 309 is less than half the width of the road or path that link 307 represents (e.g., <30 meters), then distances D and E of link 307 are both positive and the system 100 can determine that the snap is good. In this instance, the system 100 uses the distances E, D, and H to process the drive into core map attribute snap locations such that: $E=(B^{}2-A^{}2+C^{}2)/(2C)$; $H=Sqrt(B^{}2-E^{**}2)$; and $D=C-E$. In one embodiment, if the minimum distance from the snap point (i.e., distance H) keeps decreasing, the system 100 will continue to search among all of the roads within the set limit until a good snap is found, or the distance H starts to increase. In one embodiment, system 100's snapping process provides the mathematical parameters to determine the costs used in candidate selection, by giving headings and geometry for the cost functioning.

As shown in FIG. 4, the system 100 determines a HD map centerline shape point 401 (e.g., by GPS) between core map link shape points 403, 405, and 407 (e.g., nodes) of the links 409 and 411, respectively. In one embodiment, as described with respect to FIG. 2 above, if the system 100 can attach a perpendicular line H (e.g., line 413) between the shape point 401 and the link 409 and if the system 100 determines that the distance of the line 413 is less than half the width of the road that the link 409 represents, then the distances E and G of link 409 are both positive and the system 100 can determine that the snap is good or successful. In one embodiment, the system 100 can also evaluate the success of the snap (e.g., point 401 to link 409) using the following distance criteria: Both A and B<C is the best case; the last point (405) or the first point (403) is the closest to the probe point 401 is next best case (i.e., A<C or B<C); and min(A,B) is a failed result.

In one embodiment, if the system 100 achieves path lock, the system 100 can also lock in on additional links that are part of the pattern and/or adhere to digital map connectivity and access rules. This limits the connecting links to those that are reachable under normal driving conditions. In one embodiment, the system 100 can determine that path lock has been achieved when two successive HD shape points (e.g., probe points 213 and 215) are successfully snapped to the same link (e.g., link 209). In one embodiment, the system 100 uses a distance to a reference node (e.g., node 221) and a link length (e.g., link 209) to snap the vehicle (e.g., vehicle 101a) to a new point along the HD centerline (e.g., HD centerline 201). In one instance, once the system 100 determines that a lock has been made, links that are connected by the shared node (e.g., links 209 and 227) or have illegal Travel Direction can be eliminated from ambiguous search results.

In one embodiment, the system 100 generates three GPS probe patterns that are used to determine the best match of a probe points and a candidate link. In one instance, the first pattern is the heading pattern. The system 100, for example, first determines the heading of the GPS trace at each sample point. By way of example, the system 100 can calculate the heading of probe points 203, 213, and 215 between the core map link shape points 217 and 219 of the candidate link 209. In one embodiment, the system 100 then calculates the heading of each candidate point by using the normal intersection (e.g., intersection 207) and proceeds in the direction of travel either towards or away from the reference node (e.g., referenced node 221). In one embodiment, the system 100 then sums the absolute value at each sample point as follows:

$$K_1(\text{Heading Metric}) = \sum_{i=1}^{4} (\text{abs}(TravelHeading - RoadCenterlineHeading)_i.$$

In this example, $K_1$ equals a Constant Weight of 1.0 and RoadWidth is the estimated width of the on-lane count or other information.

In one embodiment, the second pattern is the distance pattern (i.e., the pattern of moving away from the path). In one instance, the system 100 calculates the distance of the projected point (e.g., probe point 223) traveling the same sample size distance (e.g., between core map shapes 219 and 225 of link 227). The system 100 may modify the calculation, in one instance, by applying the estimated width of the link or road. In one embodiment, the system 100 then calculates the distance from that point (e.g., probe point 223) to the point along the path 227 (as represented by the arrow 229). Thereafter, in one instance, the system 100 sums the values for each sample point (e.g., point 223) of each candidate link (e.g., link 227) as follows:

$$K_2(\text{Distance Metric}) = \sum_{i=1}^{4} (H)_i.$$

In this example, H is the snap distance from the road or link 227 center line to the path of the probe trace (e.g., HD center line 231) and $K_2$ equals a Constant Weight of 1.0.

In one embodiment, the third pattern is the area pattern (i.e., the pattern of moved away). In one instance, the system 100 multiplies the distance between samples (e.g., probe points 203 and 213) by the distance between the probe points 203 and 213 and the road or link 209. In one embodiment, the system 100 defines this as the average of the two endpoint distances by the distance between samples. In one instance, the system 100 can determine a simple approximation based on one-half of the area of the distance from (i.e., point 213 to link 209) multiplied by the distance along the travel path (e.g., the distance between the probe points 203 and 213 on the HD path 201). The system 100 may modify, in one instance, the distance between the two line segments (e.g., link 227 and HD center line 231) that have been linked in the distance pattern to account for the road width. In one embodiment, the system 100 can determine the area pattern as follows:

$$K_3(\text{Area Metric}) = \sum_{i=1}^{4} ((H_i) \times \text{Pointspacing}) \div 2.$$

In this instance, the $K_3$ equals a Constant Weight of 1.0, H is the distance from the road or link centerline to the path of the probe trace, Pointspacing equals min(segmentlength$_n$) ÷4, and DeltaLocation equals min(segmentlength).

In one embodiment, the system 100 then calculates the weighted sum of the three patterns. For example, the system 100 can determine the weighted sum or BadnessValue$_m$ for n (4) sample points m segments such that the BadnessValue$_m$=$K_1$(Heading pattern)+$K_2$(Distance pattern)+$K_3$(Area pattern). In one embodiment, the system 100 can square the heading and distance to create second order terms that pair well with the final pattern. Thereafter, in one instance, the system 100 selects the candidate link with the lowest overall score (i.e., lowest Badness Value) as the best overall pattern and the selected map matched road. Although the system 100 assigns each pattern an equal weight when calculating the weighted sum of the three patterns, it is contemplated that the system 100 could assign one or more patterns a different weight.

In one embodiment, if the system 100 determines that the simplest pattern (e.g., the heading pattern) provides an unambiguous solution, then the system 100 can determine that the match has been achieved and abort any further processing of the other two patterns. However, if the system 100 determines that the simplest pattern returns an ambiguous solution (i.e., no clear best pick), then the system 100 can process the candidate links using the other two patterns to resolve the ambiguity. In particular, the system 100 can use the width of the road to refine the distance and area pattern calculations that utilize distance from the centerline.

Returning to FIG. 1, as shown, the system 100 comprises one or more vehicles 101a-101n (also collectively referred to as vehicles 101) and/or one or more user equipment (UE) devices 103 that act as probes traveling over a road network (e.g., the transportation network 107). Although the vehicles 101 are depicted as automobiles, it is contemplated that the vehicles 101 can be any type of transportation vehicle, manned or unmanned (e.g., planes, aerial drone vehicles, motor cycles, boats, bicycles, etc.), and the UE 103 can be associated with any of the types of vehicles or a person or thing (e.g., a pedestrian) traveling within the transportation network 107. In one embodiment, each vehicle 101 and/or UE 103 is assigned a unique probe identifier (probe ID) for use in reporting or transmitting probe data collected by the vehicles 101 and UE 103. The vehicles 101 and UE 103, for instance, may be part of a probe-based system for collecting probe data for measuring traffic conditions in a road network. In one embodiment, each vehicle 101 and/or UE 103 is configured to report probe data as probe points, which are individual data records collected at a point in time that records telemetry data for that point in time. The probe points can be reported from the vehicles 101 and/or UEs 103 in real-time, in batches, continuously, or at any other frequency requested by the system 100 over, for instance, the communication network 109 for processing by the map matching platform 101. In one embodiment, the probe or GPS trace points are used to make a detailed correct digital map (e.g., a core map) with normal GPS accuracy as degrees given to 5 decimal places.

In one embodiment, a probe point can include attributes such as: session key, data provider, probe ID, longitude, latitude, speed, and/or time. The list of attributes is provided by way of illustration and not limitation. Accordingly, it is contemplated that any combination of these attributes or other attributes may be recorded as a probe point (e.g., such as those previously discussed above). For example, attributes such as altitude (e.g., for flight capable vehicles or for tracking non-flight vehicles in the altitude domain), tilt, steering angle, wiper activation, etc. can be included and reported for a probe point. In one embodiment, if the probe point data includes altitude information, the transportation network, links, etc. can also be paths through an airspace (e.g., to track aerial drones, planes, other aerial vehicles, etc.), or paths that follow the contours or heights of a road network (e.g., heights of different ramps, bridges, or other overlapping road features).

In one embodiment, the vehicles 101 and/or UE 103 may include sensors for reporting measuring and/or reporting attributes. The attributes can also be any attribute normally collected by an on-board diagnostic (OBD) system of the vehicle, and available through an interface to the OBD system (e.g., OBD II interface or other similar interface).

In one embodiment, the system 100 can sort probe points according to location traces or trajectories using probe provider information and/or probe identifier (probe ID) information associated with the probe data. For example, the system 100 groups probe points into common sessions (e.g., identified using a session key) that represent individual trips of probe data collection sessions (e.g., a probe trace or vehicle 101 path). The sessions can be identified by matching or grouping the probe points in the probe data according to probe identifier and sequencing the probe points according to time.

In one embodiment, the map matching platform 111 performs the processes for map matching a probe trace to a digital map based on sampling and pattern recognition as discussed with respect to the various embodiments described herein. By way of example, the mapping platform 111 can be a standalone server or a component of another device with connectivity to the communication network 109. For example, the component can be part of an edge computing network where remote computing devices (not shown) are installed along or within proximity of the transportation network 107 to provide point-based map matching of probe data collected locally or within a local area served by the remote or edge computing device.

In one embodiment, the map matching platform 111 has connectivity or access to a geographic database 113 that includes mapping data about a road network, including but not limited to the nodes/location points and links comprising the network (additional description of the geographic database 113 is provided below with respect to FIG. 5). In one embodiment, the probe data, patterns (e.g., heading, distance, and area patterns), map matching results, and/or related information can also be stored in the geographic database 113 by the map matching platform 111. In addition or alternatively, the probe data can be stored by another component of the system 100 in the geographic database 113 for subsequent retrieval and processing by the map matching platform 111.

In one embodiment, the vehicles 101 and/or UE 103 may execute an application 115 to present or use the results of the pattern-based map matching generated by the map matching platform 111 according to the embodiments described herein. For example, if the application 115 is a navigation application, then the pattern-based map matching results can be used to determine positioning information, routing information, provide updated estimated times of arrival (ETAs), and the like as shown with respect to FIGS. 10A and 10B.

By way of example, the UE 103 is any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the UE 103 can support any type of interface to the user (such as "wearable" circuitry, etc.). In one embodiment, the UE 103 may be associated with a vehicle 101 (e.g., a car), a component part of the vehicle 101, a mobile device (e.g., a mobile phone), and/or a combination of thereof. Similarly, the vehicle 101 may include computing components that can perform all or a portion of the functions of the UE 113.

By way of example, the application 115 may be any type of application that is executable at the vehicle 101 and/or the UE 103, such as mapping applications, location-based service applications, navigation applications, content provisioning services, camera/imaging application, media player applications, social networking applications, calendar applications, and the like. In one embodiment, the application 115 may act as a client for the map matching platform 111 and perform one or more functions of the map matching platform 111 alone or in combination with the map matching platform 111.

In one embodiment, the vehicles 101 and/or the UE 103 are configured with various sensors for generating probe data. By way of example, the sensors may include a global positioning sensor for gathering location data (e.g., GPS), Light Detection And Ranging (LIDAR) for gathering distance data and/or generating depth maps, infrared sensors for thermal imagery, a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data (e.g., the camera sensors may automatically capture obstruction for analysis and documentation purposes), an audio recorder for gathering audio data, velocity sensors mounted on steering wheels of the vehicles, switch sensors for determining whether one or more vehicle switches are engaged, and the like.

In another embodiment, the sensors of the vehicles 101 and/or UE 103 may include light sensors, orientation sensors augmented with height sensors and acceleration sensor (e.g., an accelerometer can measure acceleration and can be used to determine orientation of the vehicle 101), tilt sensors to detect the degree of incline or decline of the vehicle 101 along a path of travel, moisture sensors, pressure sensors, etc. In a further example embodiment, sensors about the perimeter of a vehicle 101 may detect the relative distance of the vehicle 101 from lane or roadways, the presence of other vehicles 101 (e.g., vehicle 101n), pedestrians, traffic lights, potholes and any other objects, or a combination thereof. In one scenario, the sensors may detect weather data, traffic information, or a combination thereof. This data, for instance, can also be reported as probe data. In one example embodiment, the vehicles 101 and/or UE 103 may include GPS receivers to obtain geographic coordinates from satellites 117 for determining current location and time associated with the vehicle 101 and/or UE 103 for generating probe data. Further, the location can be determined by a triangulation system such as A-GPS, Cell of Origin, or other location extrapolation technologies. By way of example, the current location and time associated with the vehicle 101 and/or UE 103 may be used by the map matching platform 111 to determine vehicle heading and link headings, which can then be used by the map matching platform 111 to determine the direction of travel along a link or road of the travel network 107.

The communication network 111 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

In one embodiment, the map matching platform 111 may be a platform with multiple interconnected components. The map matching platform 111 may include multiple servers, intelligent networking devices, computing devices, components and corresponding software for providing trajectory bundles for map data analysis. In addition, it is noted that the map matching platform 111 may be a separate entity of the system 100, a part of one or more services 119a-119m (collectively referred to as services 119) of the services platform 121, or included within the UE 103 (e.g., as part of an application 115).

The services platform 121 may include any type of service 119. By way of example, the services 119 may include mapping services, navigation services, traffic monitoring services, travel planning services, notification services, social networking services, content (e.g., audio, video, images, etc.) provisioning services, application services, storage services, contextual information determination services, location-based services, information-based services (e.g., weather, news, etc.), etc. In one embodiment, the services platform 121 may interact with the map matching platform 111, the vehicle 101, the UE 103, and/or one or more content providers 123a-123k (also collectively referred to as content providers 123) to provide the services 119, for instance, based on pattern-based map matching results generated by the map matching platform 111.

In one embodiment, the content providers 123 may provide content or data to the vehicles 101 and/or UEs 103, the map matching platform 111, and/or the services 119. The content provided may be any type of content, such as mapping content, textual content, audio content, video content, image content, etc. In one embodiment, the content providers 123 may provide content that may aid in the point-based map matching using a machine learning approach according to the various embodiments described herein. In one embodiment, the content providers 123 may also store content associated with the vehicles 101, the UE 103, the map matching platform 111, and/or the services 119. In another embodiment, the content providers 123 may manage access to a central repository of data, and offer a consistent, standard interface to data, such as a repository of probe data, probe features/attributes, link features/attributes, etc. Any known or still developing methods, techniques or processes for retrieving and/or accessing feature values for probe points and/or road links from one or more sources may be employed by the map matching platform 111.

By way of example, the vehicles 101, the UEs 103, the map matching platform 111, the services platform 121, and/or the content providers 123 communicate with each other and other components of the system 100 using well known, new or still developing protocols. In this context, a protocol includes a set of rules defining how the network nodes within the communication network 109 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 5:
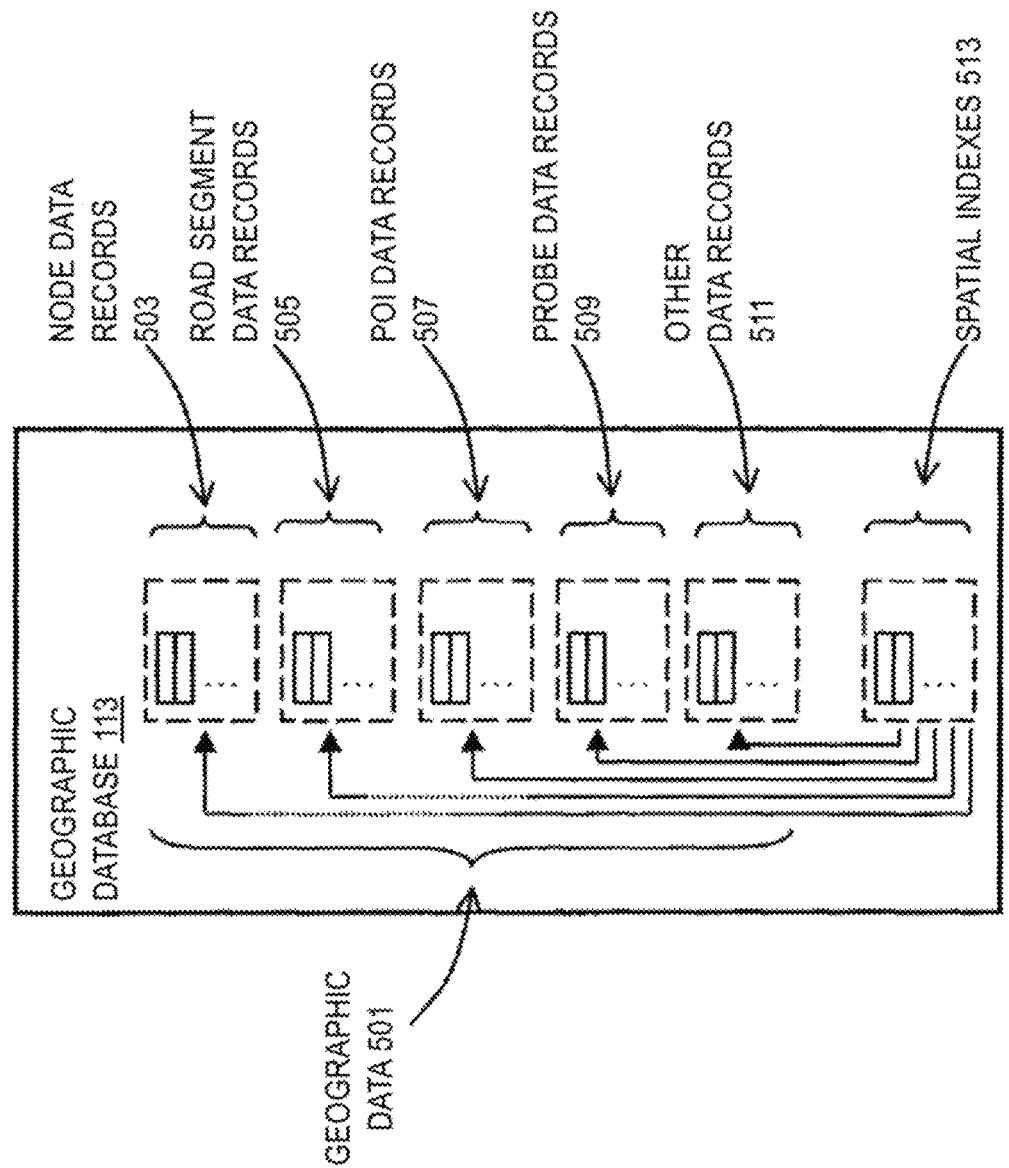
FIG. 5 is a diagram of a geographic database of FIG. 1, according to one embodiment.

FIG. 5 is a diagram of the geographic database 113 of the system 100, according to exemplary embodiments. In the exemplary embodiments, POIs and map generated POIs data can be stored, associated with, and/or linked to the geographic database 113 or data thereof. In one embodiment, the geographic database 113 includes geographic data 501 used for (or configured to be compiled to be used for) mapping and/or navigation-related services, such as for personalized route determination, according to exemplary embodiments. For example, the geographic database 113 includes node data records 503, road segment or link data records 505, POI data records 507, probe data records 509, and other data records 511, for example. More, fewer or different data records can be provided. In one embodiment, the other data records 511 include cartographic ("cartel") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using the point-based map matching embodiments describes herein), for example.

In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions, models, routes, etc. Accordingly, the terms polygons and polygon extrusions/models as used herein can be used interchangeably.

In one embodiment, the following terminology applies to the representation of geographic features in the geographic database 113.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non-reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 113 follows certain conventions. For example, links do not cross themselves and do not cross each other except at a node or vertex. Also, there are no duplicated shape points, nodes, or links. Two links that connect each other have a common node or vertex. In the geographic database 113, overlapping geographic features are represented by overlapping polygons. When polygons overlap, the boundary of one polygon crosses the boundary of the other polygon. In the geographic database 113, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

In exemplary embodiments, the road segment data records 505 are links or segments representing roads, streets, or paths, as can be used in the calculated route or recorded route information for determination of one or more personalized routes, according to exemplary embodiments. The node data records 503 are end points or vertices corresponding to the respective links or segments of the road segment data records 505. The road link data records 505 and the node data records 503 represent a road network, such as used by vehicles, cars, and/or other entities. Alternatively, the geographic database 113 can contain path segment and node data records or other data that represent pedestrian paths or areas in addition to or instead of the vehicle road record data, for example. In one embodiment, the road or path segments can include an altitude component to extend to paths or road into three-dimensional space (e.g., to cover changes in altitude and contours of different map features, and/or to cover paths traversing a three-dimensional airspace).

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 113 can include data about the POIs and their respective locations in the POI data records 507. The geographic database 113 can also include data about places, such as cities, towns, or other communities, and other geographic features, such as bodies of water, mountain ranges, etc. Such place or feature data can be part of the POI data records 507 or can be associated with POIs or POI data records 507 (such as a data point used for displaying or representing a position of a city). In addition, the geographic database 113 can include data from radio advertisements associated with the POI data records 507 and their respective locations in the probe data records 509.

In one embodiment, the geographic database 113 includes probe data records 509 which store probe point data, session keys, location traces, associations between nodes and respective closest probe points or sessions keys, node lists, and/or any other information used or generated by the map matching platform 111 to provide pattern-based map matching according to the various embodiments. For example, the probe data records 509 can store collected probe point data for map matching in a spatial index 513 or other data structure that records spatial information and relationships of the probe points.

In one embodiment, to begin bulk pattern-based map matching (e.g., bulk processing of millions of probe point records), the map matching platform 111 performs a spatial index or spatial search for all road segments in a given area of the map (e.g., 20 or 30 meters within in each GPS pattern point or an area corresponding to a selected map tile or geographic area) that is currently being processed. By way of example, the spatial index data structure can be based on any structure including, but not limited to: Kd-trees, R-trees, and Quadtrees. Each of the types of structures may have advantages and disadvantages with respect to pattern-based map matching, and the map matching platform 111 can balance these advantages/disadvantages to select an appropriate data structure. For example, with respect to Kd-trees, the advantages are that implementation can be simple, and indexing time can be extremely fast; while disadvantages are that this results in an unbalanced tree, unless sorting of input is precomputed, which can slow query times on non-uniform data. With respect to R-trees, the advantages are that this results in a balanced tree, which in turn can provide fast query times; while the disadvantages are that depending on the heuristic picked for insertion, indexing time may be slower, and implementation of R-trees can be complex. With respect to Quadtrees, the advantages are that indexing and implementation can be relatively simple; while the disadvantages are that this results in an unbalanced tree which can slow query times on unbalanced data.

The geographic database 113 can be maintained by a content provider 123 in association with the services platform 121 (e.g., a map developer). The map developer can collect geographic data to generate and enhance the geographic database 113. There can be different ways used by the map developer to collect data. These ways can include obtaining data from other sources, such as municipalities or respective geographic authorities. In addition, the map developer can employ field personnel to travel by vehicle (e.g., vehicles 101) along roads throughout the geographic region to observe features and/or record information about them, for example. Also, remote sensing, such as aerial or satellite photography, can be used.

The geographic database 113 can be a master geographic database stored in a format that facilitates updating, maintenance, and development. For example, the master geographic database 113 or data in the master geographic database 113 can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle 101 or UE 103, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

As mentioned above, the geographic database 113 can be a master geographic database, but in alternate embodiments, the geographic database 113 can represent a compiled navigation database that can be used in or with end user devices (e.g., vehicle 101, UE 103, etc.) to provide navigation-related functions. For example, the geographic database 113 can be used with the end user device to provide an end user with navigation features. In such a case, the geographic database 113 can be downloaded or stored on the end user device (e.g., vehicle 101, UE 103, etc.), such as in application 115, or the end user device can access the geographic database 113 through a wireless or wired connection (such as via a server and/or the communication network 109), for example.

Figure 10A:
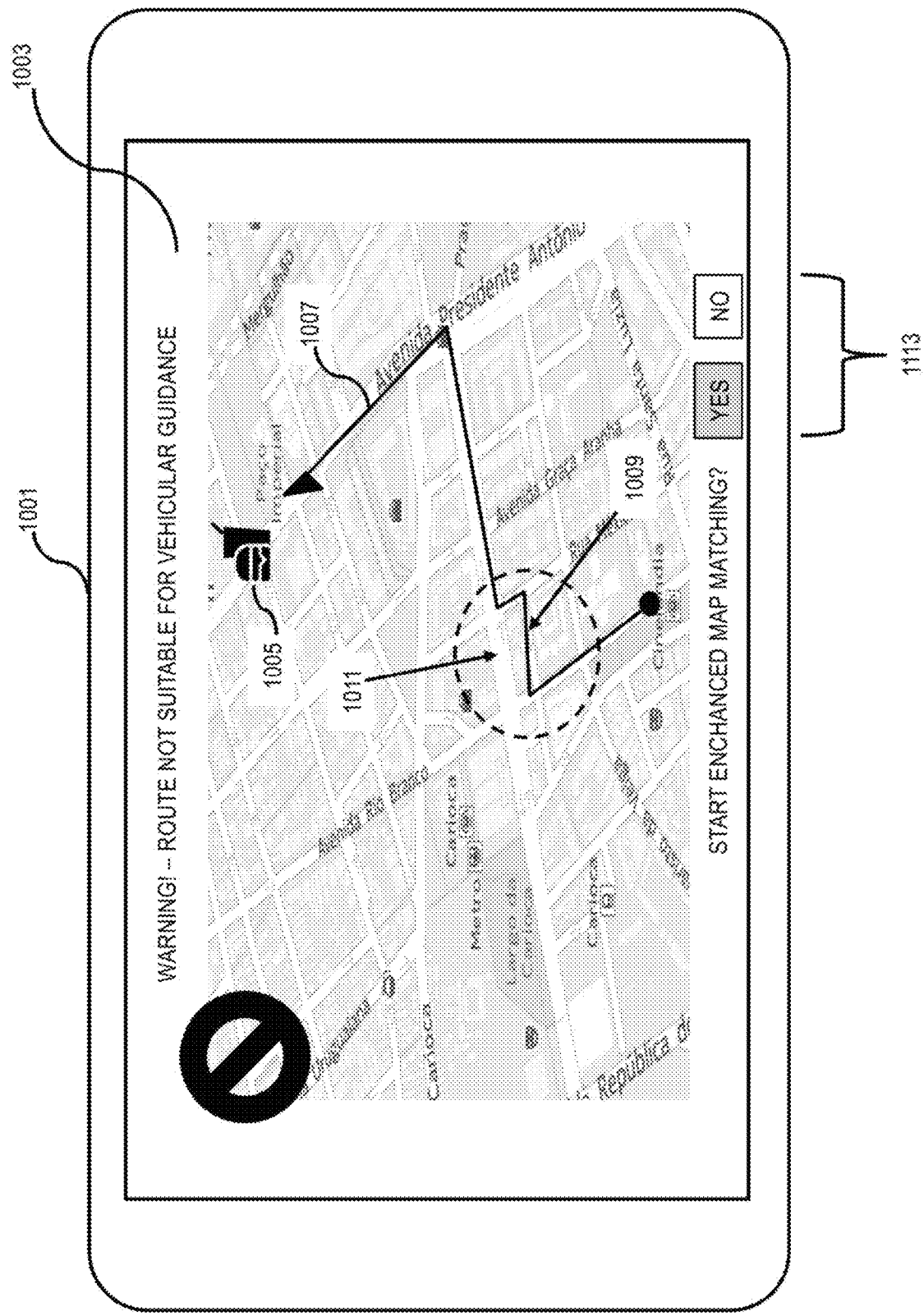
FIGS. 10A and 10B are diagrams of example user interfaces for map matching a probe trace to a digital map, according to one embodiment.
Figure 10B:
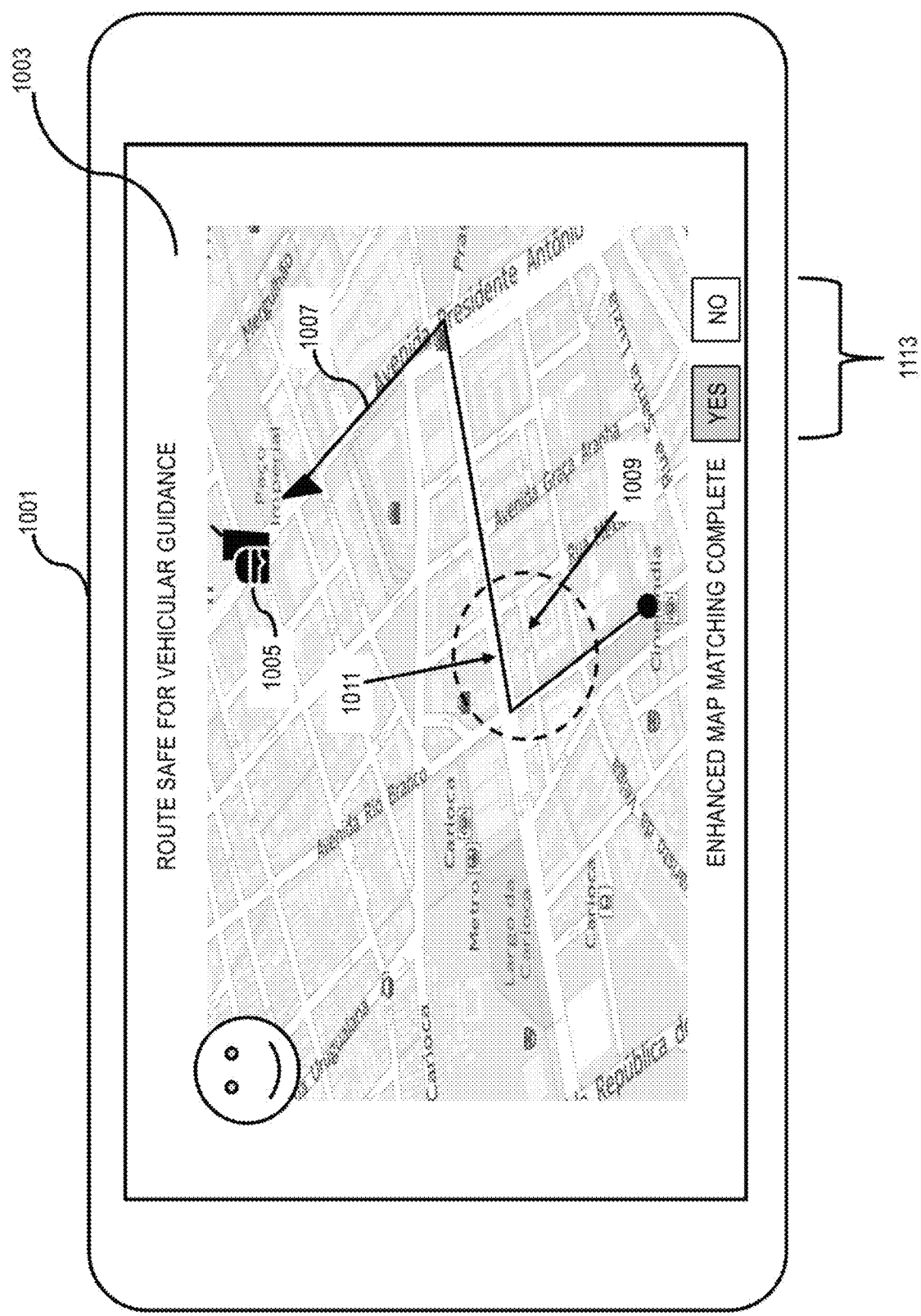

In one embodiment, the end user device (e.g., UE 103) can be an in-vehicle navigation system, a personal navigation device (PND), a portable navigation device, a cellular telephone, a mobile phone, a personal digital assistant (PDA), a watch, a camera, a computer, and/or other device that can perform navigation-related functions, such as digital routing and map display. In one embodiment, the navigation device (e.g., UE 103) can be a cellular telephone. An end user can use an application 115 or device navigation functions such as guidance and map display, for example, and for determination of route information to at least one identified point of interest, according to exemplary embodiments (e.g., as shown in FIGS. 10A and 10B).

Figure 6:
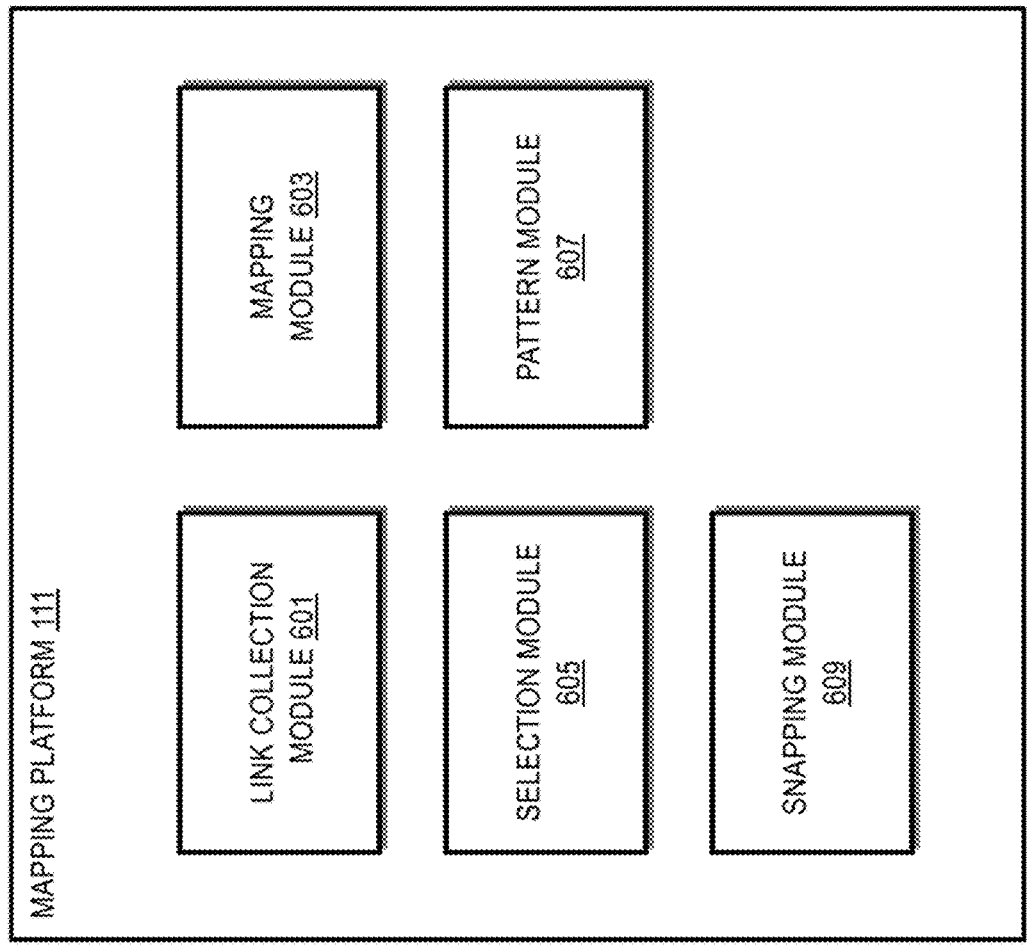
FIG. 6 is a diagram of the components of a map matching platform of FIG. 1, according to one embodiment.

FIG. 6 is a diagram of the components of a map matching platform 111, according to one embodiment. By way of example, the map matching platform 111 includes one or more components for pattern-based map matching according to the various embodiments described herein. It is contemplated that the functions of these components may be combined or performed by other components of equivalent functionality. In this embodiment, the map matching platform 111 includes a link collection module 601, a mapping module 603, a selection module 605, a pattern module 607, and a snapping module 609. The above presented modules and components of the map matching platform 111 can be implemented in hardware, firmware, software, or a combination thereof. Though depicted as a separate entity in FIG. 1, it is contemplated that the map matching platform 111 may be implemented as a module of any of the components of the system 100 (e.g., a component of the vehicle 101 and/or the UE 103). In another embodiment, one or more of the modules 601-609 may be implemented as a cloud-based service, local service, native application, or combination thereof. The functions of these modules are discussed with respect to FIGS. 7-9.

Figure 7:
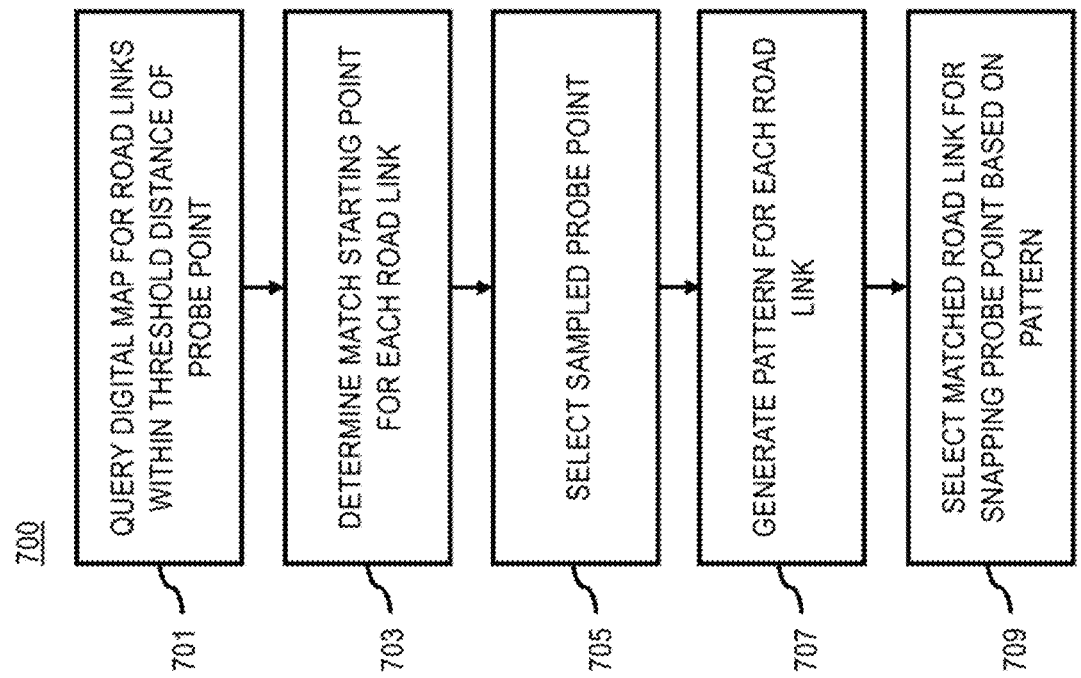
FIG. 7 is a flowchart of a process for map matching a probe point to a digital map based on sampling and pattern recognition, according to one embodiment.
Figure 12:
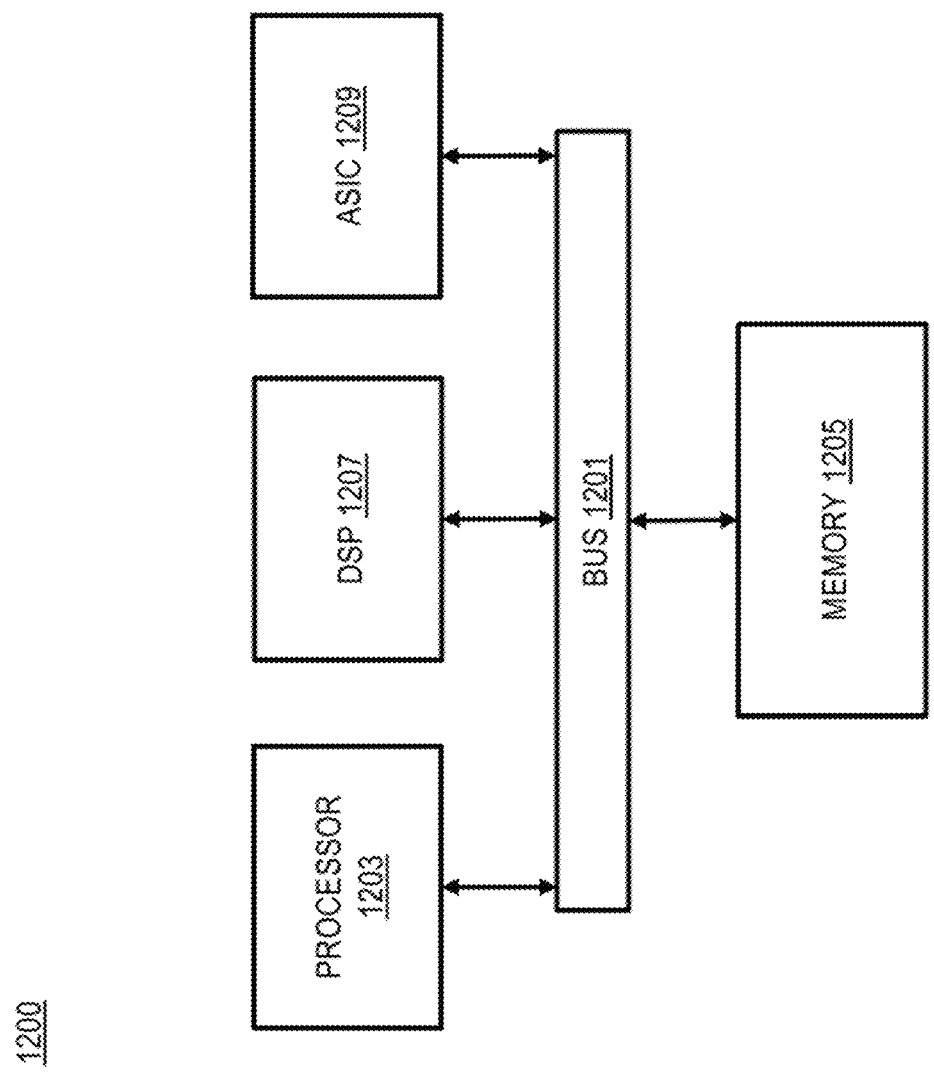
FIG. 12 is a diagram of a chip set that can be used to implement an embodiment.

FIG. 7 is a flowchart of a process for map matching a probe point to a digital map based on sampling and pattern recognition, according to one embodiment. In various embodiments, the map matching platform 111 and/or any of the modules 601-609 of the map matching platform 111 as shown in FIG. 6 may perform one or more portions of the process 700 and may be implemented in, for instance, a chip set including a processor and a memory as shown in FIG. 12. As such, the map matching platform 111 and/or the modules 601-609 can provide means for accomplishing various parts of the process 700, as well as means for accomplishing embodiments of other processes described herein in conjunction with other components of the system 100. Although the process 700 is illustrated and described as a sequence of steps, its contemplated that various embodiments of the process 700 may be performed in any order or combination and need not include all of the illustrated steps.

In step 701, the link collection module 601 queries a digital map for a set of road links within a threshold distance of a probe point of the probe trace. In one instance, the digital map is a detailed correct digital map (e.g. a core map) with normal GPS accuracy (e.g., degrees given to 5 decimal places). In one embodiment, the link collection module 601 queries the set of road links using a spatial search function that can identify all of the driveable road segments within a given distance of each GPS pattern point (e.g., within 20 or 30 meters). In one embodiment, the result of the query is a set or group of candidate roads or links (e.g., link 209) that one or more probe points (e.g., probe points 203, 213, and 215) may be potentially snapped to by the snapping module 609. In one embodiment, the mapping module 603 applies a standard costing model to the sampled segments (e.g., probe points 203, 213, and 215) of each candidate link (e.g., link 209).

In step 703, the mapping module 603 determines a match starting point for each road link of a set of road links, wherein the match starting point is an intersection point created by a normal line extending from the probe point to a topology polyline representing said each road link. By way of example, the set of road links are the road links determined by the link collection module 601 that are within a threshold distance (e.g., 20 or 30 meters) of a probe point (e.g., probe point 213). In one instance, the mapping module 603 determines the match starting point for each road link by determining the normal line (e.g., line 205) to the vehicle path or HD centerline (e.g., centerline 201) and then using the intersection of the normal and the spatial road (e.g., intersection 207) as the starting point. In another instance, the mapping module 603 can determine the match starting point by starting at the beginning of a HD centerline (e.g., HD centerline 201) and then searching for an unambiguous link snap.

In step 705, the selection module 605 selects a sampled probe point from the probe trace. In one embodiment, once the mapping module 603 determines the direction of travel along the candidate link (e.g., link 209), the selection module 605 can iteratively process each subsequent probe point (e.g., probe points 203, 213, and 215) along the probe trace 201 to determine whether one or more successive snaps is valid.

Figure 8:
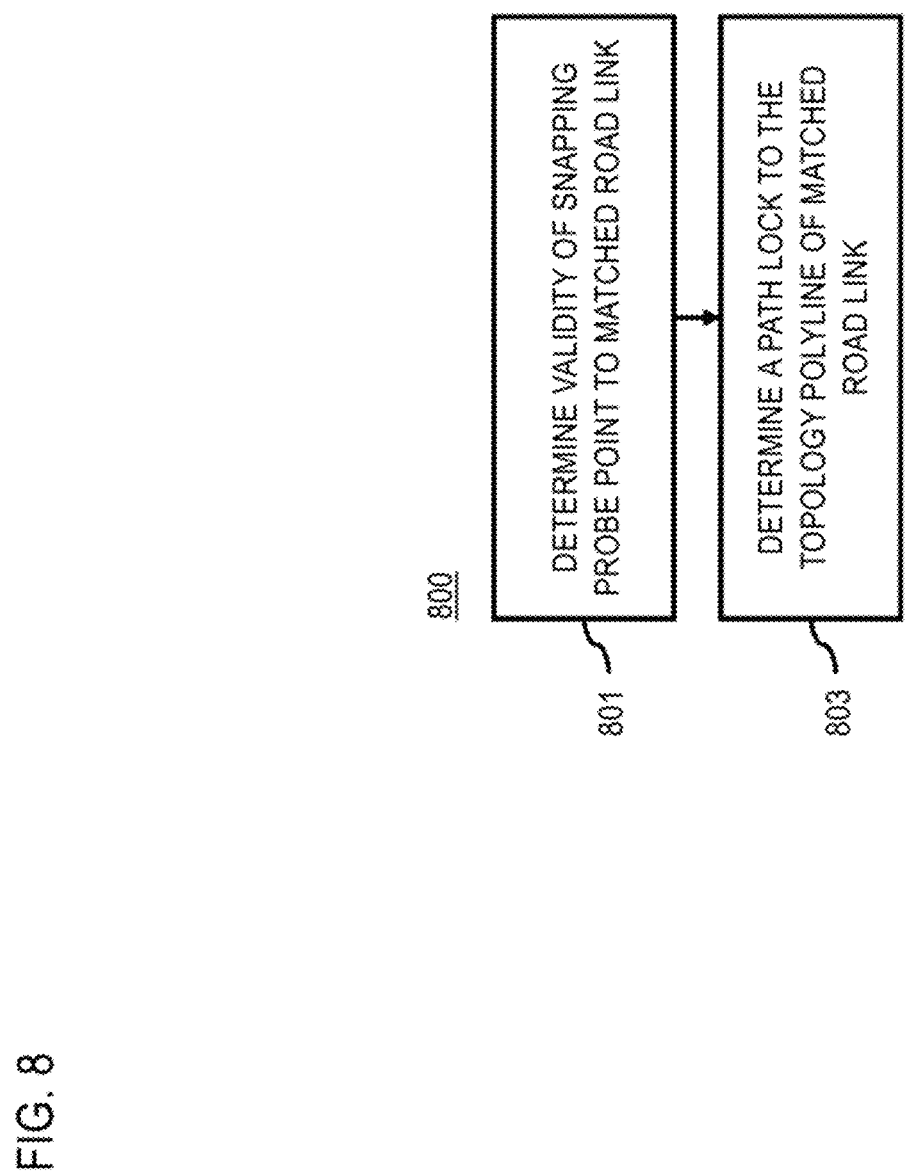
FIG. 8 is a flowchart of a process of evaluating one or more probe points snapped to a matched road link, according to one embodiment.

FIG. 8 is a flowchart of a process of evaluating one or more probe points snapped to a matched road link, according to one embodiment. In various embodiments, the map matching platform 111 and/or any of the modules 601-609 of the map matching platform 111 as shown in FIG. 6 may perform one or more portions of the process 800 and may be implemented in, for instance, a chip set including a processor and a memory as shown in FIG. 12. As such, the map matching platform 111 and/or the modules 601-609 can provide means for accomplishing various parts of the process 800, as well as means for accomplishing embodiments of other processes described herein in conjunction with other components of the system 100. Although the process 800 is illustrated and described as a sequence of steps, its contemplated that various embodiments of the process 800 may be performed in any order or combination and need not include all of the illustrated steps.

In step 801, the mapping module 603 determines a validity of the snapping of the probe point to the matched road link based on comparing the normal line from the probe point to the matched road link to a threshold value. By way of example, as described with respect to FIGS. 3 and 4, the mapping module 603 can determine that a snap is successful if the mapping module 603 can attach a perpendicular line H (e.g., line 309) between a link (e.g., link 307) and a snapped point (e.g., point 301) and if the mapping module 603 determines that the distance of the line H is less than half the width of the road or path that link 307 represents (e.g., <30 meters), then the respective distances of each half of the bisected link 307 (e.g. distances D and E of link 307) are both positive and the mapping module 603 can determine that the snap is good.

In step 803, the snapping module 609 designates a path lock to the topology polyline of the matched road link based on determining that at least a threshold number of probe points of the probe trace is snapped to the matched road link. By way of example, if two successive probe or HD shape points (e.g., probe points 213 and 215) are validly snapped to the same link (e.g., link 209), then the snapping module 609 can determine that path lock has been achieved. In one embodiment, the selection module 605 can then filter the set of road links resulting from the querying of the digital map based on the path lock. Likewise, once the snapping module 609 determines that a lock has been made, links that are connected by the shared node (e.g., links 209 and 227 connected by the shared node 219 and links 227 and 233 connected by the shared node 225) or that have illegal Travel Direction can be eliminated from ambiguous search results. In one instance, this filtering process limits the connecting links to those that are reachable under normal driving conditions.

In step 707, the pattern module 607 generates one or more patterns for said each road link based on the match starting point, the sampled probe point, the topology polyline, or a combination thereof, wherein the one or more patterns include a probe heading pattern, a probe distance pattern, a probe area pattern, or a combination thereof. In one embodiment, the one or more patterns (e.g., patterns of probe points) include at least one of: the probe heading pattern, the probe heading pattern; the probe distance pattern based on a calculated distance between any of the sampled probe point, one or more nodes on the topology polyline, one or more shape points on the topology polyline, or a combination thereof; and the probe area pattern based on a calculated area between the probe trace and the topology polyline.

In one embodiment, the pattern module 607 generates the probe heading pattern by calculating the heading of the probe point or GPS trace at each sample point. For example, the pattern module 607 can calculate the heading of probe points 203, 213, and 215 between the core map link shape points 217 and 219 of the candidate link 209. In one embodiment, the pattern module 607 calculates the heading of each candidate point (e.g., point 203) by using the normal intersection (e.g., intersection 207) and proceeding in the direction of travel either towards or away from the reference node (e.g., reference node 221). The pattern module 607, in one instance, then sums the absolute value at each sample point (e.g., 203, 213, and 215) as described above with respect to FIG. 1.

In one embodiment, the pattern module 607 generates the probe distance pattern (i.e., pattern of moving away from the path) based on a calculated distance between any of the sampled probe points (e.g., points 203 and 213), one or more nodes on the topology polyline (e.g., nodes 217 and 219), one or more shape points on the topology polyline (points 217 and 219), or a combination thereof. As described above, in one instance, the pattern module 607 calculates the distance of the projected point (e.g., probe point 223) traveling the same sample size distance (e.g., between core map shapes 219 and 225 of link 227). The pattern module 607 then calculates, in one instance, the distance from that point (e.g., probe point 223) to the point along the path 227 (as represented by the arrow 229). Thereafter, in one embodiment, the pattern module 607 sums the values for each sample point (e.g., point 223) of each candidate link (e.g., link 227)

In one embodiment, the pattern module 607 generates the probe area pattern (i.e., the pattern of moved away) based on a calculated area between the probe trace (e.g., probe trace 201) and the topology polyline (e.g., link 209). In one instance, the probe area pattern may be a fast area estimation alternative. In one embodiment, the pattern module 607 can multiply the distance between samples (e.g., probe points 203 and 213) by the distance between probe points 203 and 213 and the road or link 209. In one instance, the pattern module 607 can also determine a simple approximation based on one-half the area of the distance from (i.e., point 213 to link 209) multiplied by the distance along the travel path (e.g., the distance between the probe point 203 and 213 on the HD path 201).

Figure 9:
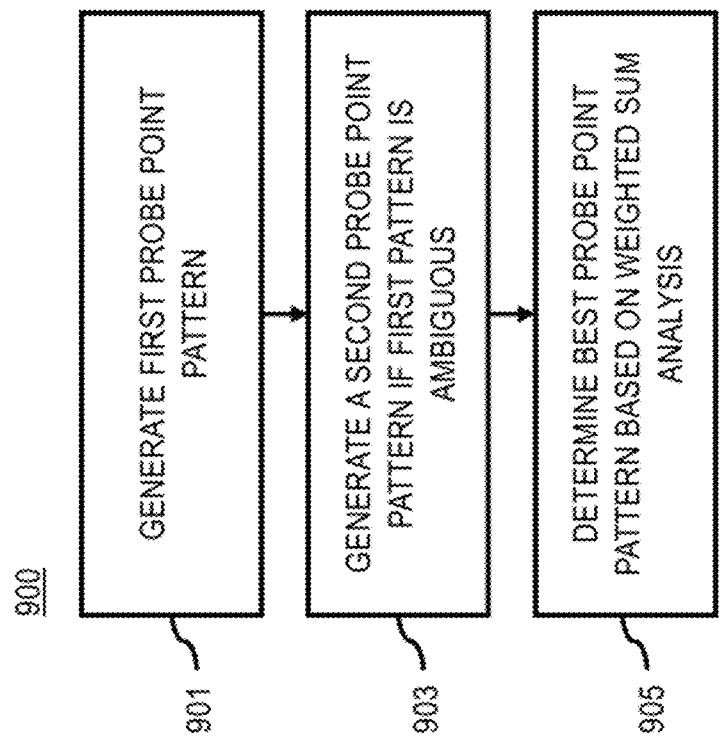
FIG. 9 is a flowchart of a process of selecting a pattern based on an unambiguously matched road link or a weighted sum calculation, according to one embodiment.

FIG. 9 is a flowchart of a process of selecting a pattern based on an unambiguously matched road link or a weighted sum calculation, according to one embodiment. In various embodiments, the map matching platform 111 and/or any of the modules 601-609 of the map matching platform 111 as shown in FIG. 6 may perform one or more portions of the process 900 and may be implemented in, for instance, a chip set including a processor and a memory as shown in FIG. 12. As such, the map matching platform 111 and/or the modules 601-609 can provide means for accomplishing various parts of the process 900, as well as means for accomplishing embodiments of other processes described herein in conjunction with other components of the system 100. Although the process 900 is illustrated and described as a sequence of steps, its contemplated that various embodiments of the process 900 may be performed in any order or combination and need not include all of the illustrated steps.

In step 901, the pattern module 607 generates a first pattern of the one or more patterns, wherein the matched road link is selected based on a determination that the first pattern results in the matched road link being an unambiguously matching road link. In one instance, the pattern module 607 generates the probe heading pattern as the first pattern since in most instances it is the simplest pattern to generate; however, it is contemplated that either the probe distance pattern or the probe area pattern could also be generated by the pattern module 607 as the first pattern. In one embodiment, if the mapping module 603 determines that the first pattern (e.g., probe heading pattern) provides an unambiguous solution (i.e., there is a clear pick which link a probe point should be snapped to), then the mapping module 603 can determine that map matching is achieved and further processing by the pattern module 607 can be aborted. By way of example, the mapping module 603 may determine that snapping the probe points 235, 223, and 237 to the links 227 and 233, respectively, provides an unambiguous solution and, therefore, further processing by the pattern module 607 can be aborted.

Optionally, in step 903, the pattern module 607 generates a second pattern of the one or more patterns based on determining that the first pattern results in an ambiguously matching road link, wherein the matched road link is selected based on the first pattern, the second pattern, or a combination thereof. By way of example, the pattern module 607 can generate any of the three patterns that were not generated as the first pattern as described more fully above with respect to FIG. 1 and step 707 of FIG. 7.

In one embodiment, if the pattern module 607 generates a second pattern in step 903, the mapping module 603 can calculate a weighted sum of the one or more patterns in step 905, wherein the matched road link is selected based on the weighted sum. In one embodiment, as described above, the mapping module 603 can calculate the weighted sum or BadnessValue$_n$, for n (4) sample points m segments using the three patterns such that the BadnessValue$_m$=K$_1$(Heading pattern)+K$_2$(Distance pattern)+K$_3$(Area pattern). In one instance, the selection module 605 then selects the candidate with the lowest overall score (i.e., the lowest BadnessValue) as the best overall pattern and the selected map matched road. In one embodiment, the mapping module 603 can square the heading and distance of the probe points to create second order terms that pair well with the final pattern (e.g., the terms may be squared to reduce statistical noise associated with a wide road).

In step 709, the selection module 605 selects a matched road link from among the set of road links based on the one or more patterns, wherein the probe point is snapped to the matched road link. In one embodiment, the selection module 605 determines the matched road link by the candidate link (e.g., link 209) with the lowest overall score. Then, in one instance, the snapping module 609 snaps the probe points (e.g., 203, 213, and 215) to the link, which can be outputted to a UE 103 for example and/or used in connection with one or more applications 115 (e.g., a navigation application).

FIGS. 10A and 10B are diagrams of example user interfaces for map matching probe points to a digital map, according to one embodiment. In this example, a UI 1001 is generated for a UE 103 (e.g., a vehicle navigation device, a mobile device, or a combination thereof) that includes a display 1003 that enables a user to access a navigation application 115 and to initiate the map matching process of the system 100 described above. In this example, the user wants to drive her or his vehicle (e.g., vehicle 101a) back to a restaurant 1005 that she or he has driven to before but cannot currently remember the route. In this instance, the user activates the navigation application 115 of the UI 1001 to see her or his past trip. Upon activation, however, the system 100 determines that there is a problem or inaccuracy with the map matching function and, therefore, the rendered route 1007 may pose a danger to the user if she or he wants to use the map matched route 1007 for vehicular travel. Specifically, the route 1007 is map matched to link 1009, which travels in the opposite direction of the intended travel direction instead of link 1011, which travels in the same direction as the intended travel direction and is the actual true route that the user traveled to the restaurant last time.

As described above, service providers face significant technical challenges to improve map matching accuracy for links that are close together and look similar (e.g., links 1009 and 1007). In this example, the system 100 can ask the user if she or he wants to initiate enhanced map matching (i.e., pattern-based map matching of probe points to a digital map). By way of example, if the user wanted to walk to the restaurant 1005, the user may not need to initiate enhanced map matching (i.e., the user can already appreciate the basic route). This could also be the case if such functions required considerable computational resources or battery life of the UE 101. In this instance, however, the user wants to use the UI 1001 to drive to the restaurant. Therefore, the user activates the enhanced map matching capabilities as described above by interacting with the inputs 1113 (e.g., pressing or tapping "yes"). Consequently, the system 100 selects the road link 1011 from among the set of road links (e.g., 1009 and 1011) based on the one or more patterns and the respective probe points are snapped to the matched road link 1011 so that the route 1007 and the user do not travel in the wrong direction on link 1009.

The processes described herein for performing pattern-based map matching of trace points to a digital map may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 11:
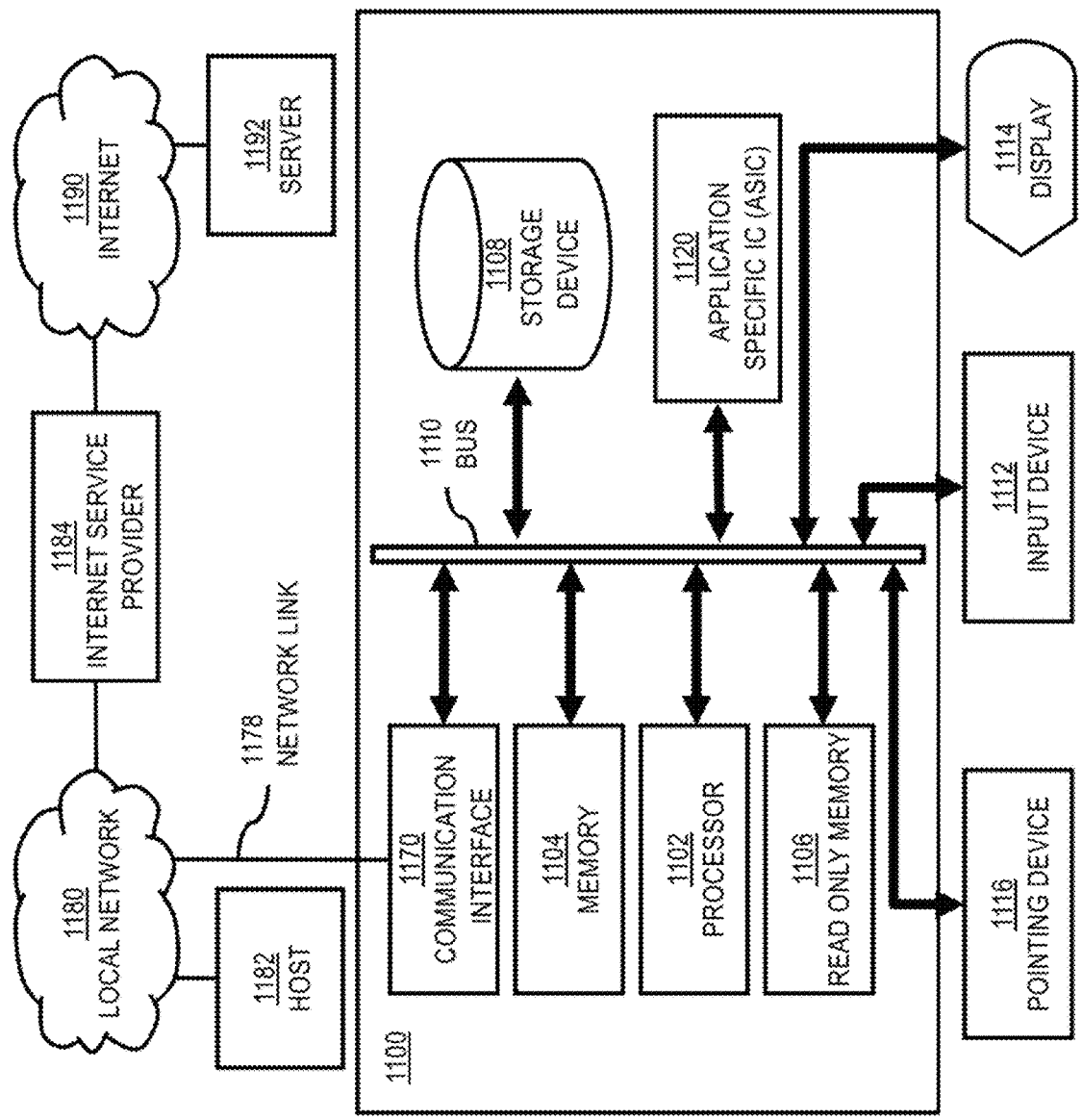
FIG. 11 is a diagram of hardware that can be used to implement an embodiment.

FIG. 11 illustrates a computer system 1100 upon which an embodiment of the invention may be implemented. Computer system 1100 is programmed (e.g., via computer program code or instructions) to perform pattern-based map matching of trace points to a digital map as described herein and includes a communication mechanism such as a bus 1110 for passing information between other internal and external components of the computer system 1100. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1110 includes one or more parallel conductors of information so that information is transferred quickly among devices coupled to the bus 1110. One or more processors 1102 for processing information are coupled with the bus 1110.

A processor 1102 performs a set of operations on information as specified by computer program code related to perform pattern-based map matching of trace points to a digital map. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1110 and placing information on the bus 1110. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1102, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1100 also includes a memory 1104 coupled to bus 1110. The memory 1104, such as a random-access memory (RAM) or other dynamic storage device, stores information including processor instructions performing pattern-based map matching of trace points to a digital map. Dynamic memory allows information stored therein to be changed by the computer system 1100. RAM allows a unit of information stored at a location called a memory address to be stored and retrieved independently of information at neighboring addresses. The memory 1104 is also used by the processor 1102 to store temporary values during execution of processor instructions. The computer system 1100 also includes a read only memory (ROM) 1106 or other static storage device coupled to the bus 1110 for storing static information, including instructions, that is not changed by the computer system 1100. Some memory is composed of volatile storage that loses the information stored thereon when power is lost. Also coupled to bus 1110 is a non-volatile (persistent) storage device 1108, such as a magnetic disk, optical disk or flash card, for storing information, including instructions, that persists even when the computer system 1100 is turned off or otherwise loses power.

Information, including instructions for performing pattern-based map matching of trace points to a digital map, is provided to the bus 1110 for use by the processor from an external input device 1112, such as a keyboard containing alphanumeric keys operated by a human user, or a sensor. A sensor detects conditions in its vicinity and transforms those detections into physical expression compatible with the measurable phenomenon used to represent information in computer system 1100. Other external devices coupled to bus 1110, used primarily for interacting with humans, include a display device 1114, such as a cathode ray tube (CRT) or a liquid crystal display (LCD), or plasma screen or printer for presenting text or images, and a pointing device 1116, such as a mouse or a trackball or cursor direction keys, or motion sensor, for controlling a position of a small cursor image presented on the display 1114 and issuing commands associated with graphical elements presented on the display 1114. In some embodiments, for example, in embodiments in which the computer system 1100 performs all functions automatically without human input, one or more of external input device 1112, display device 1114 and pointing device 1116 is omitted.

In the illustrated embodiment, special purpose hardware, such as an application specific integrated circuit (ASIC) 1120, is coupled to bus 1110. The special purpose hardware is configured to perform operations not performed by processor 1102 quickly enough for special purposes. Examples of application specific ICs include graphics accelerator cards for generating images for display 1114, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1100 also includes one or more instances of a communications interface 1170 coupled to bus 1110. Communication interface 1170 provides a one-way or two-way communication coupling to a variety of external devices that operate with their own processors, such as printers, scanners and external disks. In general, the coupling is with a network link 1178 that is connected to a local network 1180 to which a variety of external devices with their own processors are connected. For example, communication interface 1170 may be a parallel port or a serial port or a universal serial bus (USB) port on a personal computer. In some embodiments, communications interface 1170 is an integrated services digital network (ISDN) card or a digital subscriber line (DSL) card or a telephone modem that provides an information communication connection to a corresponding type of telephone line. In some embodiments, a communication interface 1170 is a cable modem that converts signals on bus 1110 into signals for a communication connection over a coaxial cable or into optical signals for a communication connection over a fiber optic cable. As another example, communications interface 1170 may be a local area network (LAN) card to provide a data communication connection to a compatible LAN, such as Ethernet. Wireless links may also be implemented. For wireless links, the communications interface 1170 sends or receives or both sends and receives electrical, acoustic or electromagnetic signals, including infrared and optical signals, that carry information streams, such as digital data. For example, in wireless handheld devices, such as mobile telephones like cell phones, the communications interface 1170 includes a radio band electromagnetic transmitter and receiver called a radio transceiver. In certain embodiments, the communications interface 1170 enables connection to the communication network 111 for performing pattern-based map matching of trace points to a digital map.

The term computer-readable medium is used herein to refer to any medium that participates in providing information to processor 1102, including instructions for execution. Such a medium may take many forms, including, but not limited to, non-volatile media, volatile media and transmission media. Non-volatile media include, for example, optical or magnetic disks, such as storage device 1108. Volatile media include, for example, dynamic memory 1104.

Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 12 illustrates a chip set 1200 upon which an embodiment of the invention may be implemented. Chip set 1200 is programmed to perform pattern-based map matching of trace points to a digital map as described herein and includes, for instance, the processor and memory components described with respect to FIG. 11 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1200 includes a communication mechanism such as a bus 1201 for passing information among the components of the chip set 1200. A processor 1203 has connectivity to the bus 1201 to execute instructions and process information stored in, for example, a memory 1205. The processor 1203 may include one or more processing cores with each core configured to perform independently. A multi-core processor enables multiprocessing within a single physical package. Examples of a multi-core processor include two, four, eight, or greater numbers of processing cores. Alternatively or in addition, the processor 1203 may include one or more microprocessors configured in tandem via the bus 1201 to enable independent execution of instructions, pipelining, and multithreading. The processor 1203 may also be accompanied with one or more specialized components to perform certain processing functions and tasks such as one or more digital signal processors (DSP) 1207, or one or more application-specific integrated circuits (ASIC) 1209. A DSP 1207 typically is configured to process real-world signals (e.g., sound) in real time independently of the processor 1203. Similarly, an ASIC 1209 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1203 and accompanying components have connectivity to the memory 1205 via the bus 1201. The memory 1205 includes both dynamic memory (e.g., RAM, magnetic disk, writable optical disk, etc.) and static memory (e.g., ROM, CD-ROM, etc.) for storing executable instructions that when executed perform the inventive steps described herein to perform pattern-based map matching of trace points to a digital map. The memory 1205 also stores the data associated with or generated by the execution of the inventive steps.

Figure 13:
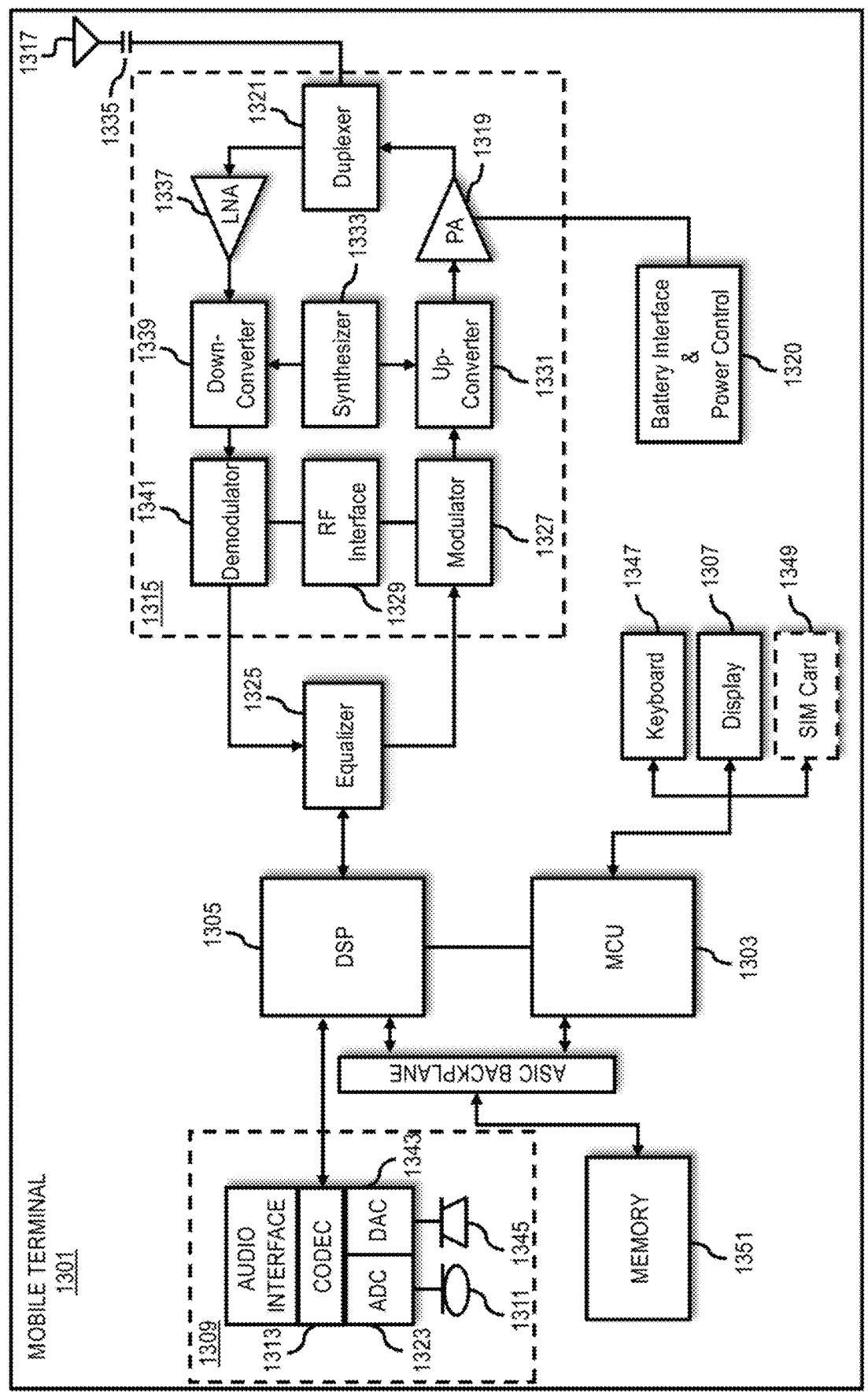
FIG. 13 is a diagram of a mobile terminal (e.g., handset or vehicle or part thereof) that can be used to implement an embodiment.

FIG. 13 is a diagram of exemplary components of a mobile terminal 1301 (e.g., handset or vehicle or part thereof) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1303, a Digital Signal Processor (DSP) 1305, and a receiver/transmitter unit including a microphone gain control unit and a speaker gain control unit. A main display unit 1307 provides a display to the user in support of various applications and mobile station functions that offer automatic contact matching. An audio function circuitry 1309 includes a microphone 1311 and microphone amplifier that amplifies the speech signal output from the microphone 1311. The amplified speech signal output from the microphone 1311 is fed to a coder/decoder (CODEC) 1313.

A radio section 1315 amplifies power and converts frequency in order to communicate with a base station, which is included in a mobile communication system, via antenna 1317. The power amplifier (PA) 1319 and the transmitter/modulation circuitry are operationally responsive to the MCU 1303, with an output from the PA 1319 coupled to the duplexer 1321 or circulator or antenna switch, as known in the art. The PA 1319 also couples to a battery interface and power control unit 1320.

In use, a user of mobile station 1301 speaks into the microphone 1311 and his or her voice along with any detected background noise is converted into an analog voltage. The analog voltage is then converted into a digital signal through the Analog to Digital Converter (ADC) 1323. The control unit 1303 routes the digital signal into the DSP 1305 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1325 for compensation of any frequency-dependent impairments that occur during transmission though the air such as phase and amplitude distortion. After equalizing the bit stream, the modulator 1327 combines the signal with a RF signal generated in the RF interface 1329. The modulator 1327 generates a sine wave by way of frequency or phase modulation. In order to prepare the signal for transmission, an up-converter 1331 combines the sine wave output from the modulator 1327 with another sine wave generated by a synthesizer 1333 to achieve the desired frequency of transmission. The signal is then sent through a PA 1319 to increase the signal to an appropriate power level. In practical systems, the PA 1319 acts as a variable gain amplifier whose gain is controlled by the DSP 1305 from information received from a network base station. The signal is then filtered within the duplexer 1321 and optionally sent to an antenna coupler 1335 to match impedances to provide maximum power transfer. Finally, the signal is transmitted via antenna 1317 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1301 are received via antenna 1317 and immediately amplified by a low noise amplifier (LNA) 1337. A down-converter 1339 lowers the carrier frequency while the demodulator 1341 strips away the RF leaving only a digital bit stream. The signal then goes through the equalizer 1325 and is processed by the DSP 1305. A Digital to Analog Converter (DAC) 1343 converts the signal and the resulting output is transmitted to the user through the speaker 1345, all under control of a Main Control Unit (MCU) 1303—which can be implemented as a Central Processing Unit (CPU) (not shown).

The MCU 1303 receives various signals including input signals from the keyboard 1347. The keyboard 1347 and/or the MCU 1303 in combination with other user input components (e.g., the microphone 1311) comprise a user interface circuitry for managing user input. The MCU 1303 runs a user interface software to facilitate user control of at least some functions of the mobile station 1301 to perform pattern-based map matching of trace points to a digital map. The MCU 1303 also delivers a display command and a switch command to the display 1307 and to the speech output switching controller, respectively. Further, the MCU 1303 exchanges information with the DSP 1305 and can access an optionally incorporated SIM card 1349 and a memory 1351. In addition, the MCU 1303 executes various control functions required of the station. The DSP 1305 may, depending upon the implementation, perform any of a variety of conventional digital processing functions on the voice signals. Additionally, DSP 1305 determines the background noise level of the local environment from the signals detected by microphone 1311 and sets the gain of microphone 1311 to a level selected to compensate for the natural tendency of the user of the mobile station 1301.

The CODEC 1313 includes the ADC 1323 and DAC 1343. The memory 1351 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1351 may be, but not limited to, a single memory, CD, DVD, ROM, RAM, EEPROM, optical storage, or any other non-volatile or non-transitory storage medium capable of storing digital data.

An optionally incorporated SIM card 1349 carries, for instance, important information, such as the cellular phone number, the carrier supplying service, subscription details, and security information. The SIM card 1349 serves primarily to identify the mobile station 1301 on a radio network. The card 1349 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A computer-implemented method for map matching a probe trace to a digital map comprising:
   querying the digital map for a set of road links within a threshold distance of a probe point of the probe trace;
   determining a match starting point for each road link of a set of road links, wherein the match starting point is an intersection point created by a normal line extending from the probe point to a topology polyline representing said each road link;
   selecting a sampled probe point from the probe trace;
   generating one or more patterns for said each road link based on the match starting point, the sampled probe point, the topology polyline, or a combination thereof, wherein the one or more patterns include a probe heading pattern, a probe distance pattern, a probe area pattern, or a combination thereof;
   selecting a matched road link from among the set of road links based on the one or more patterns, wherein the probe point is snapped to the matched road link; and
   determining a validity of the snapping of the probe point to the matched road link based on comparing a distance of the normal line from the probe point to the matched road link, wherein the distance is less than half a width of a road corresponding to the matched road link.

2. The method of claim 1, wherein each subsequent probe point of the probe trace is iteratively processed to determine subsequent respective one or more patterns for map matching.

3. The method of claim 1, wherein the one or more patterns include at least one of:
   the probe heading pattern;
   the probe area pattern based on a calculated area between the probe trace and the topology polyline
   the probe distance pattern based on a calculated distance between any of the sampled probe points, one or more nodes on the topology polyline, one or more shape points on the topology polyline, or a combination thereof; and
   the probe area pattern based on a calculated area between the probe trace and the topology polyline.

4. The method of claim 1, further comprising:
generating a first pattern of the one or more patterns,
wherein the matched road link is selected based on a determining that the first pattern results in the matched road link being an unambiguously matching road link.

5. The method of claim 4, further comprising:
generating a second pattern of the one or more patterns based on determining that another first pattern results in an ambiguously matching road link,
wherein the matched road link is selected based on the first pattern, the second pattern, or a combination thereof.

6. The method of claim 1, further comprising:
calculating a weighted sum of the one or more patterns,
wherein the matched road link is selected based on the weighted sum.

7. The method of claim 1, wherein the set of road links resulting from the querying of the digital map is filtered based on a path lock.

8. An apparatus for map matching a probe trace to a digital map comprising:
at least one processor; and
at least one memory including computer program code for one or more programs,
the at least one memory and the computer program code configured to, with the at least one processor, cause the apparatus to:
query the digital map for a set of road links within a threshold distance of a probe point of the probe trace;
determine a match starting point for each road link of a set of road links, wherein the match starting point is an intersection point created by a normal line extending from the probe point to a topology polyline representing said each road link;
select a sampled probe point from the probe trace;
generate one or more patterns for said each road link based on at least one of a probe heading pattern, a probe distance pattern, and a probe area pattern;
select a matched road link from among the set of road links based on the at least one pattern, wherein the probe point is snapped to the matched road link; and
determine a validity of the snapping of the probe point to the matched road link based on comparing a distance of the normal line from the probe point to the matched road link, wherein the distance is less than half a width of a road corresponding to the matched road link.

9. The apparatus of claim 8, wherein each subsequent probe point of the probe trace is iteratively processed to determine subsequent respective one or more patterns for map matching.

10. The apparatus of claim 8, further comprising generating the one or more patterns based on a combination of:
the probe heading pattern;
the probe distance pattern based on a calculated distance between any of the sampled probe points, one or more nodes on the topology polyline, one or more shape points on the topology polyline, or a combination thereof; and
the probe area pattern based on a calculated area between the probe trace and the topology polyline.

11. The apparatus of claim 8, further comprising:
generating a first pattern of the one or more patterns,
wherein the matched road link is selected based on a determining that the first pattern results in the matched road link being an unambiguously matching road link.

12. The apparatus of claim 11, further comprising:
generating a second pattern of the one or more patterns based on determining that another first pattern results in an ambiguously matching road link,
wherein the matched road link is selected based on the first pattern, the second pattern, or a combination thereof.

13. The apparatus of claim 8, further comprising:
calculating a weighted sum of the one or more patterns,
wherein the matched road link is selected based on the weighted sum.

14. A non-transitory computer-readable storage medium for map matching a probe trace to a digital map, carrying one or more sequences of one or more instructions which, when executed by one or more processors, cause an apparatus to perform:
querying the digital map for a set of road links within a threshold distance of a probe point of the probe trace;
determining a match starting point for each road link of a set of road links, wherein the match starting point is an intersection point created by a normal line extending from the probe point to a topology polyline representing said each road link;
selecting a sampled probe point from the probe trace;
generating one or more patterns for said each road link based on the match starting point, the sampled probe point, the topology polyline, or a combination thereof, wherein the one or more patterns include a probe heading pattern, a probe distance pattern, a probe area pattern, or a combination thereof;
selecting a matched road link from among the set of road links based on the one or more patterns, wherein the probe point is snapped to the matched road link; and
determining a validity of the snapping of the probe point to the matched road link based on comparing a distance of the normal line from the probe point to the matched road link, wherein the distance is less than half a width of a road corresponding to the matched road link.

15. The non-transitory computer-readable storage medium of claim 14, wherein each subsequent probe point of the probe trace is iteratively processed to determine subsequent respective one or more patterns for map matching.

16. The non-transitory computer-readable storage medium of claim 14, wherein the one or more patterns include at least one of:
a probe heading pattern;
a probe distance pattern based on a calculated distance between any of the sampled probe points, one or more nodes on the topology polyline, one or more shape points on the topology polyline, or a combination thereof; and
a probe area pattern based on a calculated area between the probe trace and the topology polyline.

17. The non-transitory computer-readable storage medium of claim 14, further comprising:
calculating a weighted sum of the one or more patterns,
wherein the matched road link is selected based on the weighted sum.

18. The method of claim 1, further comprising:
designating a path lock to the topology polyline of the matched road link based on determining that at least a threshold number of probe points of the probe trace is snapped to the matched road link.

* * * * *